(12) United States Patent
Onuma

(10) Patent No.: US 8,175,772 B2
(45) Date of Patent: May 8, 2012

(54) VEHICLE STEERING SYSTEM AND METHOD OF CONTROLLING THE SAME

(75) Inventor: Yutaka Onuma, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 649 days.

(21) Appl. No.: 12/373,916

(22) PCT Filed: Sep. 27, 2007

(86) PCT No.: PCT/IB2007/002815
§ 371 (c)(1),
(2), (4) Date: Jan. 15, 2009

(87) PCT Pub. No.: WO2008/038117
PCT Pub. Date: Apr. 3, 2008

(65) Prior Publication Data
US 2009/0312909 A1 Dec. 17, 2009

(30) Foreign Application Priority Data
Sep. 29, 2006 (JP) ................................ 2006-268307

(51) Int. Cl.
*B62D 6/00* (2006.01)
*B62D 117/00* (2006.01)
*B62D 137/00* (2006.01)
(52) U.S. Cl. ............................ 701/41; 180/402; 180/446
(58) Field of Classification Search ............... 701/41–44; 180/402, 446
See application file for complete search history.

(56) References Cited

U.S. PATENT DOCUMENTS

| | | | |
|---|---|---|---|
| 4,705,130 A | | 11/1987 | Fukunaga et al. |
| 5,172,785 A | * | 12/1992 | Takahashi ..................... 180/271 |
| 5,189,619 A | * | 2/1993 | Adachi et al. ................... 701/96 |
| 5,913,910 A | * | 6/1999 | Ochi et al. ........................ 701/1 |
| 5,991,675 A | | 11/1999 | Asanuma |
| 6,198,996 B1 | | 3/2001 | Berstis |
| 6,308,122 B1 | | 10/2001 | Nishizaki et al. |
| 6,487,475 B1 | * | 11/2002 | Yoshikawa ........................ 701/1 |
| 6,594,569 B2 | * | 7/2003 | Yasuda ........................... 701/41 |
| 7,537,293 B2 | * | 5/2009 | Lin et al. ....................... 303/146 |
| 7,649,445 B2 | * | 1/2010 | Kuramori et al. ............. 340/439 |
| 7,996,130 B2 | * | 8/2011 | Zhang et al. .................... 701/42 |
| 8,028,789 B2 | * | 10/2011 | Huang et al. .................. 180/443 |
| 2005/0016791 A1 | | 1/2005 | Fukushima et al. |

(Continued)

FOREIGN PATENT DOCUMENTS
EP 1 052 161 11/2000
(Continued)

*Primary Examiner* — Ruth Ilan
(74) *Attorney, Agent, or Firm* — Oblon, Spivak, McClelland, Maier & Neustadt, L.L.P.

(57) ABSTRACT

An electronic control unit receives a detection value from each sensor, and determines a familiarity degree coefficient indicating the degree of driver's familiarity with steering characteristics, using the received detection values. When the coefficient has a value near "0", a desired actual steering angle is calculated to be a small value, and when the coefficient has a value near "1", a desired actual steering angle is calculated to be a large value. When the coefficient has a value near "0", a time constant of an actual steering actuator is set to a large value, and when the coefficient has a value near "1", the time constant is set to a small value. A reaction torque is determined based on the coefficient.

17 Claims, 16 Drawing Sheets

U.S. PATENT DOCUMENTS

| | | | |
|---|---|---|---|
| 2005/0039971 A1* | 2/2005 | Fujioka et al. | 180/402 |
| 2006/0217860 A1 | 9/2006 | Ihara | |

FOREIGN PATENT DOCUMENTS

| | | |
|---|---|---|
| GB | 2 154 523 | 9/1985 |
| JP | 6 199155 | 7/1994 |
| JP | 6 328985 | 11/1994 |
| JP | 7 47970 | 2/1995 |
| JP | 10 329739 | 12/1998 |
| JP | 2000 231326 | 8/2000 |
| JP | 2001 107766 | 4/2001 |
| JP | 2001 253353 | 9/2001 |
| JP | 2003 175849 | 6/2003 |
| JP | 2005 125933 | 5/2005 |
| JP | 2005 186679 | 7/2005 |

* cited by examiner

VEHICLE STEERING SYSTEM AND METHOD OF CONTROLLING THE SAME

FIELD OF THE INVENTION

The present invention relates to a vehicle steering system, and a method of controlling the same. More specifically, the present invention relates to a vehicle steering system including: a steering wheel that is operated by a driver to steer a vehicle; a reaction force actuator for adjusting the reaction force provided against an operation of the steering wheel; an actual steering actuator for steering a steered wheel(s); and a controller that adjusts the magnitude of the reaction force by driving the reaction force actuator in accordance with the operation of the steering wheel, and that controls steering of the steered wheel(s) by driving the actual steering actuator, and to a method of controlling the same.

BACKGROUND OF THE INVENTION

In recent years, steering-by-wire steering systems of this kind have been actively developed. Japanese Patent Application Publication No. 7-47970, for example, describes a controller for a vehicle steering system that estimates the driving skill of a driver under certain driving conditions at various time points, and changes control characteristics of the steering system in accordance with the estimated driving skill to control the steering system in accordance with driving conditions of the vehicle, thereby always optimally controlling a steering system of a vehicle that is significantly affected by driving skills. This controller for a vehicle steering system can always optimally estimate the driving skill of a driver regardless of the driving conditions of the vehicle, by determining the actual trajectory of the vehicle from turning behavior of the vehicle, determining a desired trajectory from the operation performed by the driver, or from a driving path of the vehicle on a map, and estimating the driving skill of the driver by comparing the integral of the deviation of the actual trajectory from the desired trajectory with a predetermined value every predetermined period of time.

In general, when a driver who has driven a vehicle equipped with a steering system (hereinafter referred to as the conventional steering system) that steers the steered wheels by a certain steering amount mechanically determined relative to the amount of operation of a steering wheel switches to a vehicle equipped with a steering system (hereinafter referred to as the actual steering amount-variable steering system) that can change the amount of actual steering of the steered wheels relative to the amount of operation of the steering wheel, the driver is highly likely to feel a sense of discomfort with the difference between the steering characteristics of these steering systems. Specifically, with the actual steering amount-variable steering system, it is possible to steer the steered wheels by a large steering amount even when the amount of operation of the steering wheel by a driver is small. Thus, for a driver who knows the steering characteristics of the actual steering amount-variable steering system well, that is, who is familiar with the steering characteristics thereof, excellent operability is obtained because the amount of operation of the steering wheel can be reduced.

However, a driver who does not know the steering characteristics of the actual steering amount-variable steering system well, that is, who is not familiar with the steering characteristics thereof can feel a sense of discomfort with such actual steering action of the steered wheels. Specifically, even a driver with excellent driving skills can feel a sense of discomfort with the steering characteristics, and feel it difficult to drive the vehicle until the driver becomes familiar with the steering characteristics (actual steering action) typical of the actual steering amount-variable steering system after a switch from the steering characteristics of the conventional steering system. Accordingly, it is important for a driver to become familiar with the steering characteristics typical of the actual steering amount-variable steering system in order to eliminate the sense of discomfort, and to feel it easy to drive.

However, the period (time) required for a driver to become familiar with the steering characteristics typical of the actual steering amount-variable steering system, and the degree of familiarity with the typical steering characteristics significantly vary depending on the difference in the driving background of the drivers, such as the experience in driving a vehicle. Specifically, a driver who has excellent driving skills and is familiar with driving of vehicles is highly likely to soon become familiar with the steering characteristics typical of the actual steering amount-variable steering system. On the other hand, a driver who has less opportunity to drive vehicles is highly likely to take a long time to become familiar with the steering characteristics typical of the actual steering amount-variable steering system. Accordingly, with regard to the actual steering amount-variable steering system, in consideration of the fact that the familiarity degree differs depending on the driver driving the vehicle, it is desired that excellent operability be obtained for all drivers, that is, that driving of vehicles become easy.

DISCLOSURE OF THE INVENTION

An object of the present invention is to provide a vehicle steering system that makes driving of a vehicle easy by taking the degree of driver's familiarity with the steering characteristics of the steering system into consideration, and a method of controlling the vehicle steering system.

A first aspect of the present invention relates to a vehicle steering system. The vehicle steering system includes: a steering wheel, operated by a driver, for steering a vehicle; a reaction force actuator for adjusting reaction force provided against an operation of the steering wheel; an actual steering actuator for steering a steered wheel; and a controller that adjusts magnitude of the reaction force by driving the reaction force actuator in accordance with an operation of the steering wheel, and that controls steering of the steered wheel by driving the actual steering actuator. In the vehicle steering system, the controller includes: a familiarity degree-determining section for determining a degree of driver's familiarity with steering characteristics that reflect relations between a certain operation of the steering wheel and both of a reaction force characteristic and an actual steering characteristic of the steered wheel in response to the certain operation of the steering wheel; a steering characteristic-changing section for changing the steering characteristics in accordance with the determined degree of driver's familiarity; and an actuator operation-controlling section for controlling operation of the reaction force actuator and the actual steering actuator based on the steering characteristics changed by the steering characteristic-changing section.

In this case, the steering characteristic-changing section may include at least one of a reaction force characteristic changing section for making a switch to a reaction force characteristic that the less familiar with the steering characteristics a driver is, the stronger the reaction force provided against an operation of the steering wheel is, based on the familiarity degree determined by the familiarity degree-determining section, and an actual steering characteristic-changing section for making a switch to an actual steering characteristic that the less familiar with the steering characteristics a driver is, the gentler the actual steering action of the steered wheel is in response to an operation of the steering wheel, based on the familiarity degree determined by the familiarity degree-determining section. In this case, the actual steering characteristic-changing section may make a switch to an actual steering characteristic that the less familiar with the steering characteristics a driver is, the smaller a ratio of an amount of actual steering of the steered wheel to an amount of operation of the steering wheel becomes, and the larger a time constant of the actual steering actuator driven in response to an operation of the steering wheel becomes.

With the above configurations, when the steering system in which the steered wheels are steered separately from operation of the steering wheel is operated, it is possible to determine the degree of driver's familiarity with the steering characteristics based on physical quantities (the amount of operation of the steering wheel, and kinetic state quantities of the vehicle, such as lateral acceleration and yaw rate, for example) that vary according to the difference in the experience in operating the steering wheel of the steering system, more specifically, the difference in the experience in driving the vehicle on which the steering system is mounted. In addition, it is possible to change the steering characteristics in accordance with the determined familiarity degree.

Thus, in the case where a driver is unfamiliar with the steering characteristics, for example, it is possible to make a switch to a reaction force characteristic that large reaction force is applied to impede that the steering handle is operated by a large amount, and it is also possible to make a switch to an actual steering characteristic that steered wheels are gently steered. On the other hand, in the case where a driver is familiar with the steering characteristics, it is possible to make a switch to a reaction force characteristic that small reaction force is applied so that it is possible to turn the steering wheel with agility, and it is also possible to make a switch to an actual steering characteristic that steered wheels are quickly steered. In addition, it is possible to control operation of the reaction force actuator and the actual steering actuator based on the changed steering characteristics. Thus, it is possible to set appropriate steering characteristics in accordance with the degree of driver's familiarity with the steering characteristics, which enables a driver to easily drive the vehicle.

The familiarity degree-determining section may include: an operation amount-detecting section for detecting an amount of operation of the steering wheel by a driver; and a kinetic state quantity-detecting section for detecting a kinetic state quantity of the vehicle that varies due to an operation of the steering wheel, wherein the degree of driver's familiarity with the steering characteristics may be determined based on at least one of the operation amount detected by the operation amount-detecting section, the kinetic state quantity of the vehicle detected by the kinetic state quantity-detecting section, and a desired kinetic state quantity of the vehicle that is calculated based on the detected operation amount. In this case, the kinetic state quantity-detecting section may detect at least one of lateral acceleration and yaw rate of the vehicle caused due to an operation of the steering wheel, for example.

The familiarity degree-determining section may determine the degree of driver's familiarity based on, for example, the steering wheel operation amount detected by the operation amount-detecting section, and a value of a time derivative of the detected operation amount. The familiarity degree-determining section may determine the degree of driver's familiarity based on, for example, the kinetic state quantity of the vehicle detected by the kinetic state quantity-detecting section, and a value of a time derivative of the detected kinetic state quantity of the vehicle. The familiarity degree-determining section may determine the degree of driver's familiarity based on, for example, a value of a time derivative of the steering wheel operation amount detected by the operation amount-detecting section, and a value of a desired lateral acceleration of the vehicle or a value of a desired yaw rate of the vehicle, the latter two values being calculated based on the detected steering wheel operation amount.

The familiarity degree-determining section may determine the degree of driver's familiarity based on, for example, a peak value, in terms of variation with time, of the steering wheel operation amount detected by the operation amount-detecting section, and a peak value, in terms of variation with time, of the time derivative of the operation amount. The familiarity degree-determining section may determine the degree of driver's familiarity based on, for example, a peak value, in terms of variation with time, of the kinetic state quantity of the vehicle detected by the kinetic state quantity-detecting section, and a peak value, in terms of variation with time, of the time derivative of the kinetic state quantity of the vehicle. The familiarity degree-determining section may determine the degree of driver's familiarity based on, for example, a peak value, in terms of variation with time, of the time derivative of the steering wheel operation amount detected by the operation amount-detecting section, and a peak value, in terms of variation with time, of the calculated, desired lateral acceleration or desired yaw rate of the vehicle.

With these configurations, it is possible to use the amount of operation of the steering wheel and the time derivative thereof, the lateral acceleration of the vehicle and the time derivative thereof, and the yaw rate of the vehicle and the time derivative thereof as the physical quantities that vary according to the difference in the experience in operating the steering wheel. In addition, it is possible to use the amount of operation of the steering wheel and the time derivative thereof, the desired lateral acceleration, and the desired yaw rate as such physical quantities. Thus, it is possible to more accurately determine the degree of driver's familiarity with the steering characteristics. In addition, it is possible to determine the degree of driver's familiarity with the steering characteristics, taking the peak value of the amount of operation of the steering wheel in terms of the variation with time thereof and the peak value of the time derivative of the operation amount in terms of the variation with time thereof into consideration, or taking the peak value of the kinetic state quantities of the vehicle in terms of the variation with time thereof and the peak value of the time derivative of the kinetic state quantities of the vehicle in terms of the variation with time thereof into consideration. In this way, it is possible to significantly improve the accuracy in determining the degree of familiarity, and to make a switch to the steering characteristics that are more suited to the driver.

The familiarity degree-determining section may determine the degree of driver's familiarity when, for example, a turning operation of the steering wheel that causes an absolute value of the operation amount detected by the operation amount-detecting section to increase is being performed. With this configuration, the degree of familiarity is determined when a driver can stably operate the steering wheel, and it is therefore possible to more accurately determine the degree of familiarity. As a result, it is possible to make a switch to the steering characteristics that are more suited to the driver.

The familiarity degree-determining section may include: an operation amount-detecting section for detecting an amount of operation of the steering wheel by a driver; a kinetic state quantity-detecting section for detecting a kinetic state quantity of the vehicle that varies due to an operation of the steering wheel; an ignition switch operation state-detecting section for detecting an operational state of an ignition switch provided in the vehicle; a familiarity degree coefficient-determining section for determining a familiarity degree coefficient that indicates the degree of driver's familiarity, based on at least one of the operation amount detected by the operation amount-detecting section, the kinetic state quantity of the vehicle detected by the kinetic state quantity-detecting section, and a desired kinetic state quantity of the vehicle that is calculated based on the detected operation amount; a familiarity degree coefficient-storing section for storing the familiarity degree coefficient that is determined by the familiarity degree coefficient-determining section immediately before a shift to an off state of the ignition switch is detected by the ignition switch operation state-detecting section; an off-state time-determining section for, when a shift from an off state to an on state of the ignition switch is detected by the ignition switch operation state-detecting section, determining off-state time during which the ignition switch is maintained in the off state; and a familiarity degree coefficient-correcting section for correcting the familiarity degree coefficient stored in the familiarity degree coefficient-storing section, based on the off-state time determined by the off-state time-determining section. In the vehicle steering system, the steering characteristic-changing section may change the steering characteristics based on the degree of familiarity indicated by the familiarity degree coefficient corrected by the familiarity degree coefficient-correcting section.

In this case, for example, the familiarity degree coefficient-correcting section may correct the familiarity degree coefficient stored in the familiarity degree coefficient-storing section so that the longer the off-state time determined by the off-state time-determining section is, the less familiarity of a driver with the steering characteristics that reflect relations between a certain operation of the steering wheel and both of a reaction force characteristic and an actual steering characteristic of the steered wheel in response to the certain operation of the steering wheel the familiarity degree coefficient indicates.

With these configurations, it is possible to correct the familiarity degree coefficient in accordance with the interval between drives of the vehicle by the same driver. With regard to the correction of the familiarity degree coefficient, it is possible to correct the familiarity degree coefficient so that the longer the interval between drives of the vehicle by the same driver is, the less familiarity the familiarity degree coefficient indicates. Thus, although there is a possibility that, even in the case where a driver once becomes familiar with the steering characteristics, the driver again becomes unfamiliar and feels a sense of discomfort with the steering characteristics if the driver has not driven the vehicle for a long period of time, for example, it is possible to make a switch to the steering characteristics according to the current degree of driver's familiarity with the steering characteristics by correcting the familiarity degree coefficient based on the period of time for which the driver has not driven the vehicle. Thus, even in such a case, a driver can easily drive the vehicle.

The controller may further include: a driver-identifying section for identifying a driver who drives the vehicle; a driver-dependent familiarity degree coefficient-storing section for storing the degree of familiarity determined by the familiarity degree-determining section for each driver who is identified by the driver-identifying section; and a familiarity degree-setting section for performing initial setting of the degree of familiarity of each driver identified by the driver-identifying section, using the degree of familiarity stored in the driver-dependent familiarity degree coefficient-storing section.

In this case, the controller may further include: an ignition switch operation state-detecting section for detecting an operational state of an ignition switch provided in the vehicle; an off-state time-determining section for, when a shift from an off state to an on state of the ignition switch is detected by the ignition switch operation state-detecting section in response to an operation by a driver identified by the driver-identifying section, determining off-state time during which the ignition switch is maintained in the off state; and a driver-dependent familiarity degree correction section for correcting the familiarity degree, of which initial setting has been performed by the familiarity degree-setting section, so that the longer the off-state time determined by the off-state time-determining section is, the less familiarity of a driver with the steering characteristics that reflect relations between a certain operation of the steering wheel and both of a reaction force characteristic and an actual steering characteristic of the steered wheel in response to the certain operation of the steering wheel the familiarity degree indicates.

With these configurations, it is possible to store the degree of familiarity for each driver who drives the vehicle, and it is therefore possible to set the degree of familiarity that is suited to a driver, with the use of the stored degree of familiarity when the next driving is started. In addition, it is also possible to correct the stored degree of familiarity in accordance with the interval between drives of the vehicle by a driver. Thus, it is possible to make a switch to the optimal steering characteristics based on the degree of familiarity of drivers, so that a driver can more easily drive the vehicle.

The controller may further include: an emergency avoidance operation state-determining section for determining whether an emergency avoidance operation of the steering wheel is being performed by a driver; and an emergency avoidance operation-time familiarity degree-correcting section for, when it is determined by the emergency avoidance operation state-determining section that the emergency avoidance operation of the steering wheel is being performed by a driver, correcting the familiarity degree determined by the familiarity degree-determining section so that the familiarity degree indicates that a driver is sufficiently familiar with the steering characteristics.

The emergency avoidance operation state-determining section may determine whether an emergency avoidance operation is being performed, based on an amount of operation of the steering wheel, a value of a time derivative of the operation amount, and a speed of the vehicle.

With this configuration, when an emergency avoidance operation of the steering wheel is being performed in order to avoid a collision between the vehicle and a collision obstacle, the degree of driver's familiarity with the steering characteristics is temporarily corrected so that the degree of familiarity indicates that the driver is sufficiently familiar with the steering characteristics. Thus, it is possible to enhance the turning performance of the vehicle at the time of an emergency avoidance by making a switch to a reaction force characteristic that small reaction force is applied so that it is possible to operate the steering wheel by a large amount, or by making a switch to an actual steering characteristic that the steered wheels are quickly turned in response to a turning operation of the steering wheel. Accordingly, a driver can very easily drive the vehicle under emergency avoidance conditions.

A second aspect of the present invention relates to a method of controlling a vehicle steering system, and more specifically, to a method of controlling a vehicle steering system that includes: a steering wheel, operated by a driver, for steering a vehicle; a reaction force actuator for adjusting reaction force provided against an operation of the steering wheel; an actual steering actuator for steering a steered wheel; and a controller that adjusts magnitude of the reaction force by driving the reaction force actuator in accordance with an operation of the steering wheel, and that controls steering of the steered wheel by driving the actual steering actuator. The control method includes the steps of: determining a degree of driver's familiarity with steering characteristics that reflect relations between a certain operation of the steering wheel and both of a reaction force characteristic and an actual steering characteristic of the steered wheel in response to the certain operation of the steering wheel; changing the steering characteristics in accordance with the determined degree of driver's familiarity; and controlling operation of the reaction force actuator and the actual steering actuator based on the changed steering characteristics.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF EMBODIMENTS

First Embodiment

Figure 1:
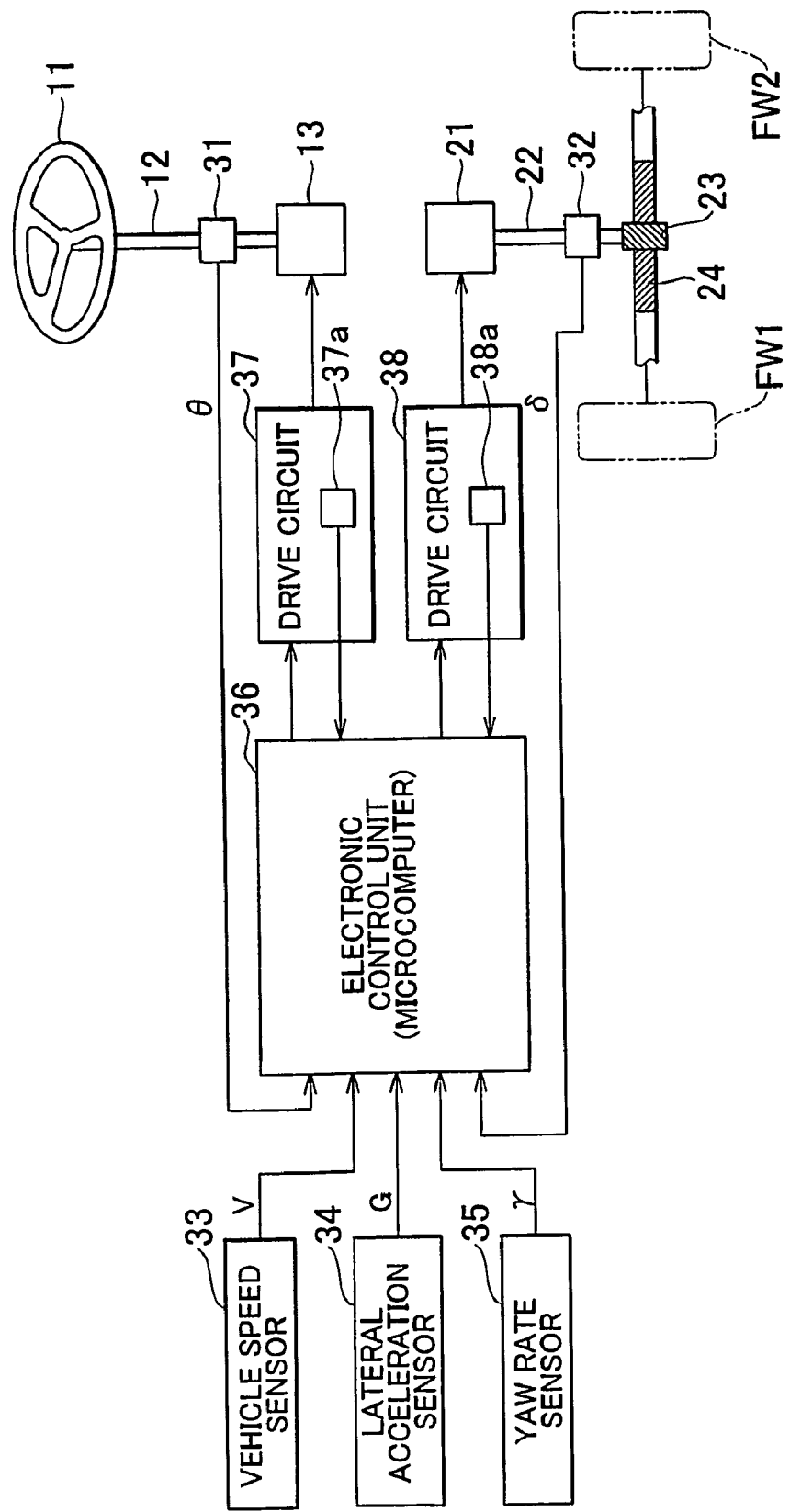
FIG. 1 is a schematic diagram of a vehicle steering system that is common to first to fourth embodiments of the present invention.

A vehicle steering system according to an embodiment of the present invention will be described below with reference to the drawings. FIG. 1 schematically shows the vehicle steering system, in which a common steering-by-wire system is used, according to first to fourth embodiments.

The steering system includes a steering wheel 11, which is turned by a driver, for steering right and left front wheels FW1 and FW2 as steered wheels. The steering wheel 11 is fixed to the upper end of a steering operation input shaft 12, and the lower end of the steering operation input shaft 12 is connected to a reaction force actuator 13 including an electric motor and a speed reducer. The reaction force actuator 13 provides a reaction force against a turning operation of the steering wheel 11 by the driver.

The steering system includes an actual steering actuator 21 having an electric motor and a speed reducer. The steering force produced by the actual steering actuator 21 is transmitted to the right and left front wheels FW1 and FW2 through an actual steering output shaft 22, a pinion gear 23, and a rack bar 24. With this configuration, the rotational force provided by the actual steering actuator 21 is transmitted to the pinion gear 23 through the actual steering output shaft 22, rotation of the pinion 23 causes the rack bar 24 to be displaced in the longitudinal direction, and this displacement of the rack bar 24 in the longitudinal direction causes the right and left front wheels FW1 and FW2 to be steered to right and left.

Next, an electric controller for controlling operation of the reaction force actuator 13 and the actual steering actuator 21 will be described. The electric controller includes a steering operation angle sensor 31, an actual steering angle sensor 32, a vehicle speed sensor 33, a lateral acceleration sensor 34, and a yaw rate sensor 35.

The steering operation angle sensor 31, which is installed on the steering operation input shaft 12, detects the rotation angle of the steering wheel 11 relative to the neutral position thereof, and outputs the angle as a steering operation angle θ. The actual steering angle sensor 32, which is installed on the actual steering output shaft 22, detects the rotation angle of the actual steering output shaft 22 relative to the neutral position thereof, and outputs the angle as an actual steering angle δ (corresponding to the actual steering angle of the right and left front wheels FW1 and FW2). In this specification, the neutral position refers to the operational position of the steering wheel 11, the steering operation input shaft 12, the actual steering-output shaft 22, and the right and left front wheels FW1 and FW2, where the vehicle is kept moving straight ahead. With regard to the steering operation angle θ and the actual steering angle δ, these angles are zero at the neutral position, counterclockwise rotation angles are represented by positive values, and clockwise rotation angles are represented by negative values.

The vehicle speed sensor 33 detects and outputs a vehicle speed V. The lateral acceleration sensor 34 detects and outputs an actual lateral acceleration G of the vehicle. The yaw rate sensor 35 detects and outputs an actual yaw rate γ of the vehicle. It should be noted that the actual lateral acceleration G and the actual yaw rate γ are also represented by positive values in the case of leftward acceleration and yaw rates, and by negative values in the case of rightward acceleration and yaw rates.

These sensors 31 to 35 are connected to an electronic control unit 36. The electronic control unit 36, which includes, as a main component, a microcomputer having a CPU, an EEPROM, a RAM, and a timer, controls operation of the reaction force actuator 13 and the actual steering actuator 21 by executing various programs that include a program described later. Connected to the output side of the electronic control unit 36 are drive circuits 37 and 38 for driving the reaction force actuator 13 and the actual steering actuator 21. Provided in the drive circuits 37 and 38 are electric current detectors 37a and 38a for detecting the values of the driving electric current flowing through the electric motors in the reaction force actuator 13 and the actual steering actuator 21. The driving electric current values detected by the electric current detectors 37a and 38a are fed back to the electronic control unit 36 to control drive of these electric motors.

Next, operation of the steering-by-wire steering system configured as described above, more specifically, operation of the steering system in which the actual steering output shaft 22 can rotate relative to the steering operation input shaft 12, will be described. In general, when a driver who has a long experience in operating the normal steering system in which there is no relative rotation between the steering operation input shaft and the actual steering output shaft operates the steering-by-wire steering system, it is necessary for the driver to become familiar with the difference in steering characteristics that reflect relations between operation of the steering wheel, and both of the reaction force characteristic and the actual steering characteristic. The degree (hereinafter referred to as the degree of familiarity) to which a driver becomes familiar with the difference in the steering characteristics is different depending on the driver.

Figure 2:
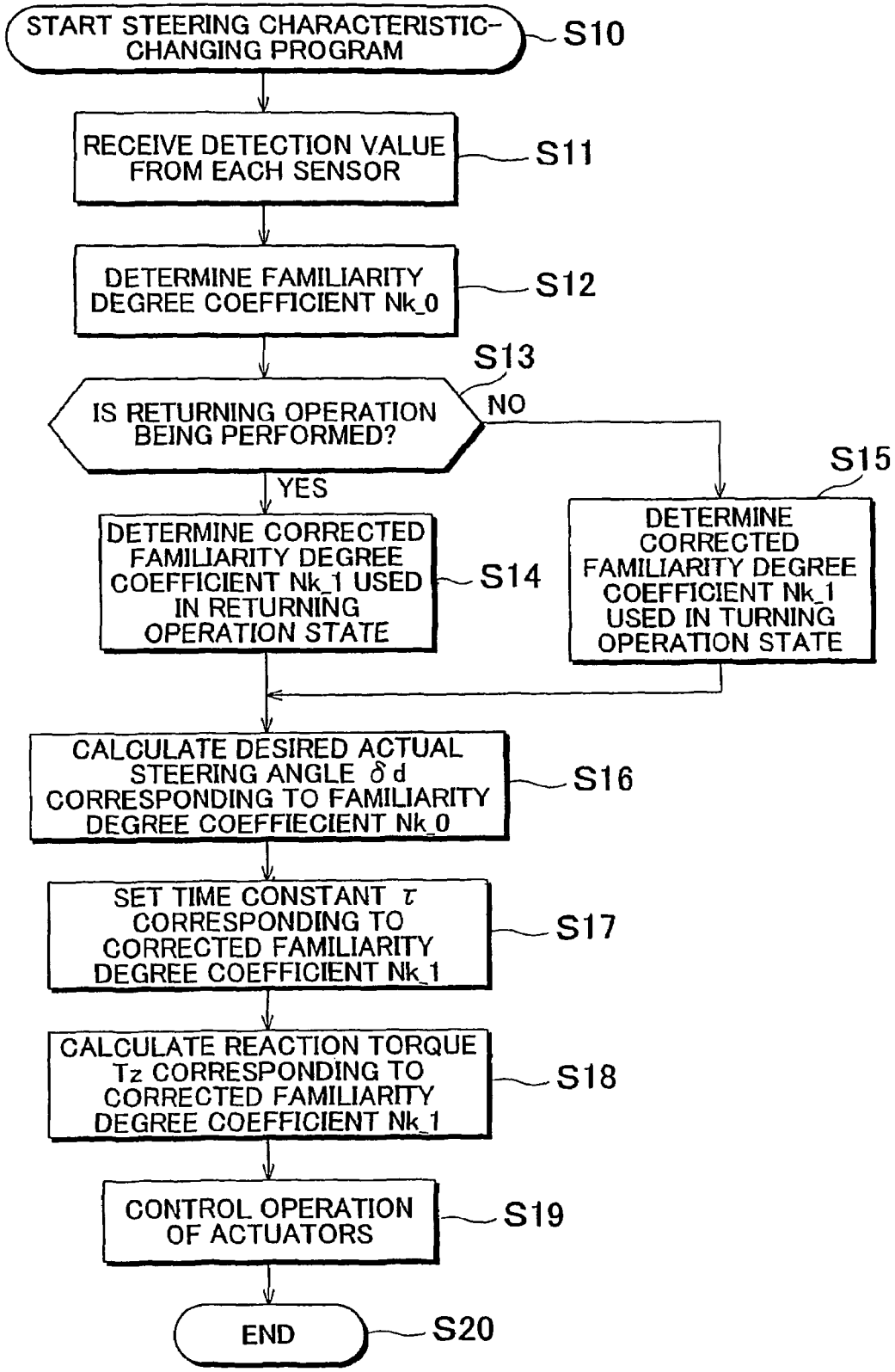
FIG. 2 is a flow chart illustrating a steering characteristic-changing program, which is executed by an electronic control unit shown in FIG. 1, according to the first embodiment of the present invention.

Thus, the electronic control unit 36 executes the steering characteristic-changing program shown in FIG. 2 to appropriately change the steering characteristics of the steering-by-wire system, taking the degree of familiarity of the driver into consideration. The steering characteristic-changing program will be specifically described below.

When an ignition switch (not shown) is turned on, the electronic control unit 36 repeatedly executes the steering characteristic-changing program every predetermined period of time. Specifically, the electronic control unit 36 starts to execute the steering characteristic-changing program in step S10, and receives values detected by the sensors 31 to 35 in step S11. After receiving the detection values, the electronic control unit 36 proceeds to step S12.

In step S12, the electronic control unit 36 estimates and determines a familiarity degree coefficient Nk_0 indicating the in-vehicle driver's degree of familiarity with the steering characteristics of the steering-by-wire system. The familiarity degree coefficient Nk_0 is a variable that varies from "0" to "1". The less familiar with the steering characteristics the in-vehicle driver is, the closer to "0" the value of the familiarity degree coefficient Nk_0 is set. The more familiar with the steering characteristics the driver is, the closer to "1" the value of the familiarity degree coefficient Nk_0 is set.

The electronic control unit 36 estimates and determines the familiarity degree coefficient Nk_0 based on all of the physical quantities mainly relating to the driving experience of the driver, such as: the mileage over which and the drive time during which a driver drives the vehicle while operating the steering-by-wire steering system; the number of corrective turning operations of the steering wheel 11 at the time of turning the vehicle; and the amount of change in behavior of the vehicle as a result of a turning operation of the steering wheel 11. For this purpose, the present inventor has conducted experiments with respect to various people different in sex, age, the driving record, etc. to obtain the relations between the familiarity degree coefficient Nk_0, and the mileage, the driving experience, the corrective turning operation number, and the behavior change amount, in order to more accurately estimate and determine the familiarity degree coefficient Nk_0 of the in-vehicle driver. As a result, it has been found that a driver has less familiarity with the steering characteristics when the mileage over which and the drive time during which the driver drives the vehicle equipped with the steering-by-wire steering system are shorter, when the number of corrective turning operations of the steering wheel 11 at the time of turning the vehicle is larger, or when the amount of change in behavior of the vehicle is greater.

Accordingly, the electronic control unit 36 estimates and determines the familiarity degree coefficient Nk_0 based on, for example, the current mileage and drive time of the vehicle, the number of corrective turning operations of the steering wheel 11 at the time of turning the vehicle, and the amount of change in the actual lateral acceleration G and the actual yaw rate γ that are received from the lateral acceleration sensor 34 and the yaw rate sensor 35, respectively, in step S11. The electronic control unit 36 determines the familiarity degree coefficient Nk_0 in step S12 and proceeds to step S13.

In step S13, the electronic control unit 36 determines whether the absolute value of the detected steering angle θ received from the steering operation angle sensor 31 in step S11 is decreasing, that is, whether a returning operation of the steering wheel 11 is being performed. Specifically, when the absolute value of the detected steering angle θ is decreasing, the electronic control unit 36 makes an affirmative determination (Yes) and proceeds to step S14.

In step S14, the electronic control unit 36 corrects the familiarity degree coefficient Nk_0 determined in step S12 in consonance with the situation where a returning operation of the steering wheel 11 is being performed. Specifically, when the actual steering output shaft 22 can rotate relative to the steering operation input shaft 12, such as in the case of the steering-by-wire steering system, it is possible to appropriately change the ratio between the amount of rotation of the steering operation input shaft 12 and the amount of rotation of the actual steering output shaft 22 (the gear ratio, for example). Thus, it is made possible to easily turn the vehicle, or stabilize the turning behavior thereof by changing the amount of actual steering of the right and left front wheels FW1 and FW2 with respect to the amount of turning the steering wheel 11. However, with regard to such actual steering characteristic, there is a case where the actual steering action of the right and left front wheels FW1 and FW2 becomes fast particularly when a returning operation of the steering wheel 11 is performed, which can make a driver who is familiar with the steering characteristics of a steering-by-wire system feel a sense of discomfort with the actual steering action of the right and left front wheels FW1 and FW2.

Figure 3:
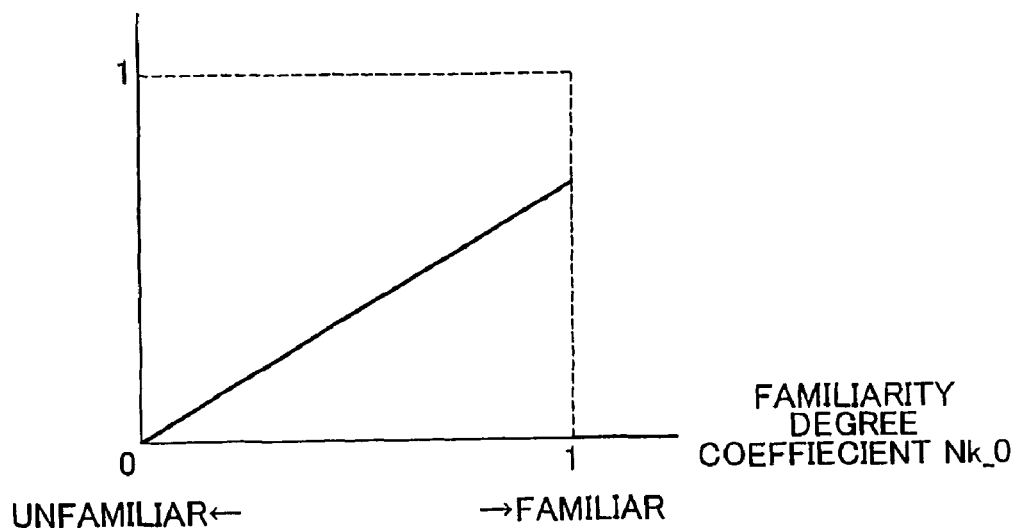
FIG. 3 is a graph showing a relation between a familiarity degree coefficient and a corrected familiarity degree coefficient.

Thus, when a returning operation of the steering wheel 11 is being performed, the electronic control unit 36 sets a corrected familiarity degree coefficient Nk_1 that is obtained by correcting the familiarity degree coefficient Nk_0 determined in step S12 to a lower value as shown in FIG. 3. After setting the corrected familiarity degree coefficient Nk_1, the electronic control unit 36 proceeds to step S16.

On the other hand, when the absolute value of the detected steering angle θ is increasing, that is, when a turning operation of the steering wheel 11 is being performed, the electronic control unit 36 makes a negative determination (No) in step S13 and proceeds to step S15. In step S15, in order to adapt the familiarity degree coefficient Nk_0 to the use in the following steps, the electronic control unit 36 defines the familiarity degree coefficient Nk_0 determined in step S12 as the corrected familiarity degree coefficient Nk_1. After determining the corrected familiarity degree coefficient Nk_1 used in the turning operation state, the electronic control unit 36 proceeds to step S16.

In step S16, in order to steer the right and left front wheels FW1 and FW2 according to the familiarity degree coefficient Nk_0 determined in step S12, the electronic control unit 36 calculates, based on the following expression 1, a desired actual steering angle δd that varies power-functionally, for example.

$$\delta d = (1/Kg) \cdot a \cdot \theta^I \quad \text{(Expression 1)}$$

Figure 4:
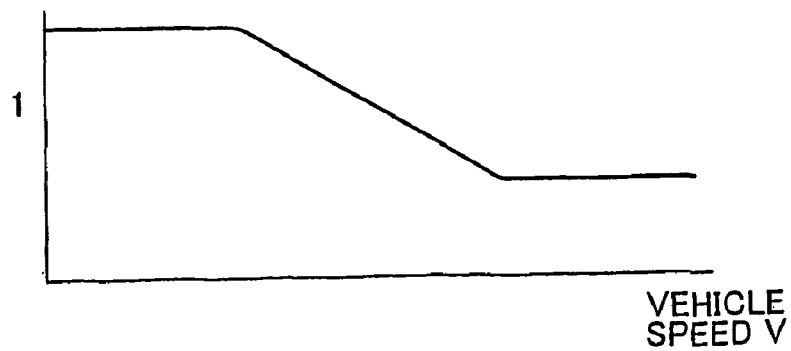
FIG. 4 is a graph showing a relation between a vehicle speed and a vehicle speed coefficient.

In the expression 1, a is a vehicle speed coefficient that varies according to a detected vehicle speed V received from the vehicle speed sensor 33 in step S11. As shown in FIG. 4, the vehicle speed coefficient has a characteristic that the vehicle speed coefficient is greater than "1" in the region in which the detected vehicle speed V is low, it is less than "1" in the region in which the detected vehicle speed V is high, and it nonlinearly decreases across the value "1" as the detected vehicle speed V increases. The ratio of the amount of rotation of the actual steering output shaft 22 to the amount of rotation of the steering operation input shaft 12, such as a transmission ratio or a gear ratio, may be used as the vehicle speed coefficient a.

In addition, θ in the expression 1 is the absolute value of the detected steering operation angle θ received from the steering operation angle sensor 31 in step S11. When the detected steering operation angle θ has a positive value, the vehicle speed coefficient a is set to a positive value. When the detected steering operation angle θ has a negative value, the vehicle speed coefficient a is set to a negative value whose absolute value is equal to the positive value of a. Moreover, I in the expression 1 is a constant representing the exponent, and is set to a value greater than "1".

Figure 5:
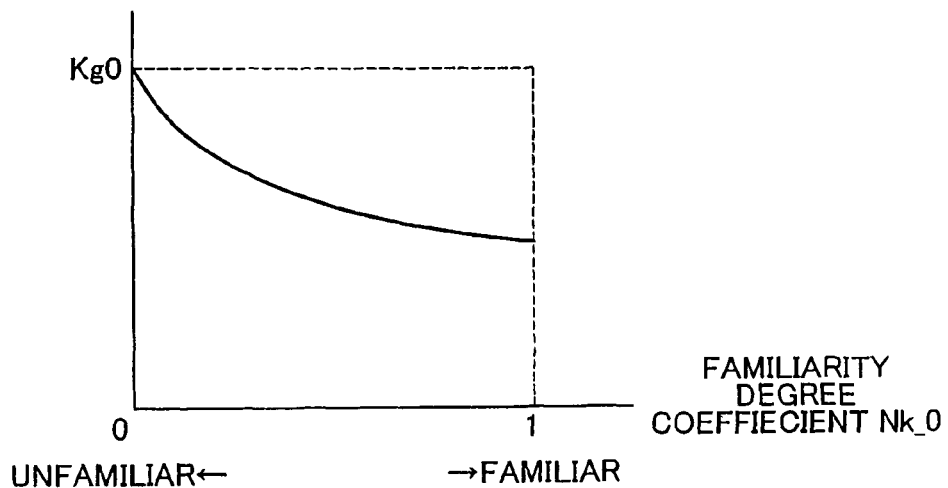
FIG. 5 is a graph showing a relation between the familiarity degree coefficient and an actual steering amount correction coefficient.

Furthermore, Kg in the expression 1 is an actual steering amount correction coefficient that varies according to the familiarity degree coefficient Nk_0 determined in step S12. As shown in FIG. 5, the actual steering amount correction coefficient Kg has a characteristic that: the smaller the familiarity degree coefficient Nk_0 is, that is, the less familiar with the steering characteristics a driver is, the larger the actual steering amount correction coefficient Kg becomes up to a large value Kg0; and the larger the familiarity degree coefficient Nk_0 is, that is, the more familiar with the steering characteristics the driver is, the smaller the actual steering amount correction coefficient Kg becomes (up to "1", for example). When the actual steering amount correction coefficient Kg varies according to the familiarity degree coefficient Nk_0, it is made possible to steer the right and left front wheels FW1 and FW2 in accordance with the driver's familiarity with the steering characteristics of the steering-by-wire system.

Specifically, in the case of a driver who is unfamiliar with the steering characteristics of the steering-by-wire system, that is, when the familiarity degree coefficient Nk_0 is set to a value near "0", the actual steering amount correction coefficient Kg is set to a large value. Thus, the result of calculation of the value of the desired actual steering angle δd that power-functionally varies as the driver turns the steering wheel 11, more specifically, varies with the variation in the detected steering operation angle θ, becomes relatively small, and as a result, it is possible to gently steer the right and left front wheels FW1 and FW2. Accordingly, even a driver who is unfamiliar with the steering characteristics of the steering-by-wire system can easily turn the vehicle.

On the other hand, in the case of a driver who is familiar with the steering characteristics of the steering-by-wire system, that is, when the familiarity degree coefficient Nk_0 is set to a value near "1", the actual steering amount correction coefficient Kg is set to a small value. Thus, the result of calculation of the value of the desired actual steering angle δd that power-functionally varies becomes relatively small, and as a result, it is possible to quickly steer the right and left front wheels FW1 and FW2. Accordingly, a driver who is familiar with the steering characteristics of the steering-by-wire system can, for example, easily turn the vehicle with a small amount of turning operation of the steering wheel 11 when the speed is low. After calculating the desired actual steering angle δd, the electronic control unit 36 proceeds to step S17.

Figure 6:
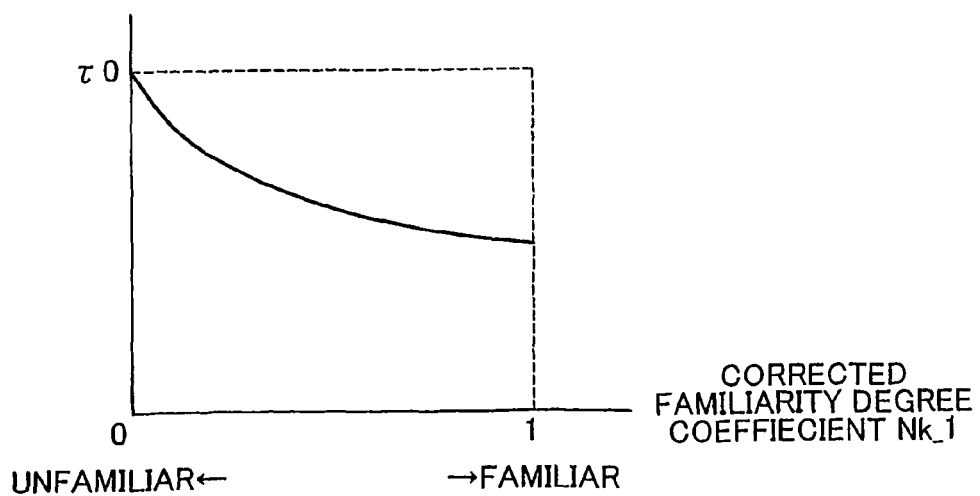
FIG. 6 is a graph showing a relation between the corrected familiarity degree coefficient and a time constant.

In step S17, the electronic control unit 36 changes the response of the actual steering action of the right and left front wheels FW1 and FW2 to a turning operation of the steering wheel 11 by a driver, according to the value of the corrected familiarity degree coefficient Nk_1 determined in step S14 or S15. Specifically, the electronic control unit 36 changes a time constant τ of a soft filter, or variable time constant filter, provided in the drive circuit 38, according to the value of the corrected familiarity degree coefficient Nk_1. As shown in FIG. 6, the time constant τ has a characteristic that the time constant τ increases up to a large value τ0 as the value of the corrected familiarity degree coefficient Nk_1 decreases, and it decreases as the value of the corrected familiarity degree coefficient Nk_1 increases.

Specifically, when the corrected familiarity degree coefficient Nk_1 is small, in other words, when a driver is unfamiliar with the steering characteristics of the steering-by-wire system, the electronic control unit 36 sets the time constant τ to a large value. Thus, it is possible to slightly delay the time at which the actual steering actuator 21 (more specifically, a motor) starts to operate, of which drive is controlled according to the turning operation of the steering wheel 11 by a driver, and it is therefore possible to slow down the response of the actual steering action of the right and left front wheels FW1 and FW2. In this way, even when a driver who is unfamiliar with the steering characteristics of the steering-by-wire system turns the steering wheel 11 relatively rapidly, the right and left front wheels FW1 and FW2 are prevented from being rapidly steered, and it is therefore possible to suitably reduce fluctuations in the behavior of the vehicle due to the turning operation of the steering wheel 11 by a driver.

On the other hand, when the corrected familiarity degree coefficient Nk_1 is large, in other words, when a driver is familiar with the steering characteristics of the steering-by-wire system, the electronic control unit 36 sets the time constant τ to a small value. Thus, it is possible to advance the time at which the actual steering actuator 21 (more specifically, the electric motor) starts to operate in response to a turning operation of the steering wheel 11 by a driver, and it is therefore possible to quicken the response of the actual steering action of the right and left front wheels FW1 and FW2. In this way, a driver who is familiar with the steering characteristics of the steering-by-wire system is enabled to cause the vehicle to quickly turn according to the driver's turning operation of the steering wheel 11. After setting the time constant τ in this way, the electronic control unit 36 proceeds to step S18.

In step S18, the electronic control unit 36 calculates, in accordance with the following expression 2, a desired reaction torque Tz that is provided against a turning operation of the steering wheel 11 by a driver according to the value of the corrected familiarity degree coefficient Nk_1 determined in step S14 or S15.

$$Tz = Ks \cdot Ts + Kf \cdot Tf + Kr \cdot Tr \quad \text{(Expression 2)}$$

In the expression 2, Ts represents spring-term torque that varies according to the value of the detected steering operation angle θ received from the steering operation angle sensor 31 in step S11, Tf represents friction-term torque that varies according to the value of the time derivative value dθ/dt (hereinafter, the derivative value is referred to as the steering operation angular velocity dθ/dt) of the detected steering operation angle θ, and Tr represents viscosity-term torque that varies according to the value of the steering operation angular velocity dθ/dt.

Figure 7:
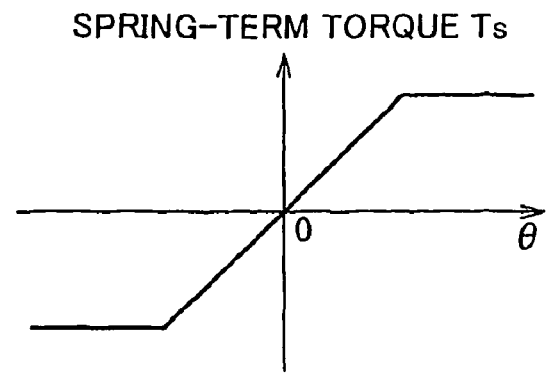
FIG. 7 is a graph showing a relation between a steering operation angle and a spring-term torque.
Figure 8:
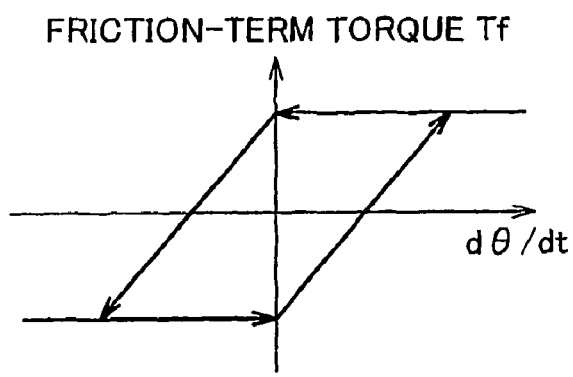
FIG. 8 is a graph showing a relation between a steering operation angular velocity and a friction-term torque.
Figure 9:
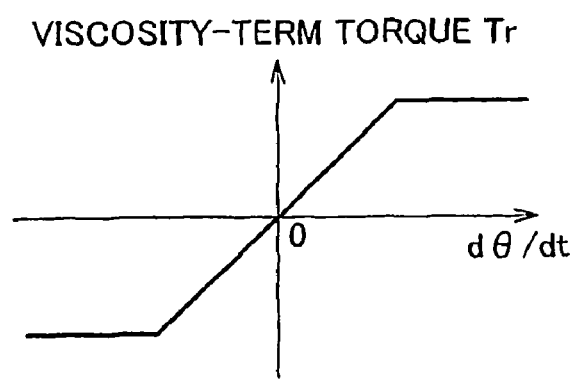
FIG. 9 is a graph showing a relation between the steering operation angular velocity and a viscosity-term torque.

The spring-term torque Ts, the friction-term torque Tf, and the viscosity-term torque Tr will now be briefly described. The spring-term torque Ts is proportional to the detected steering operation angle θ, and the electronic control unit 36 calculates the spring-term torque Ts corresponding to a detected steering operation angle θ, using a conversion table having a characteristic as shown in FIG. 7. The friction-term torque Tf depends on the value of the steering operation angular velocity dθ/dt, and has a hysteresis characteristic, and the electronic control unit 36 calculates the friction-term torque Tf corresponding to a steering operation angular velocity dθ/dt, using a conversion table having a characteristic as shown in FIG. 8. The viscosity-term torque Tr is proportional to the steering operation angular velocity dθ/dt, and the electronic control unit 36 calculates the viscosity-term torque Tr corresponding to a steering operation angular velocity dθ/dt, using a conversion table having a characteristic as shown in FIG. 9.

Figure 10:
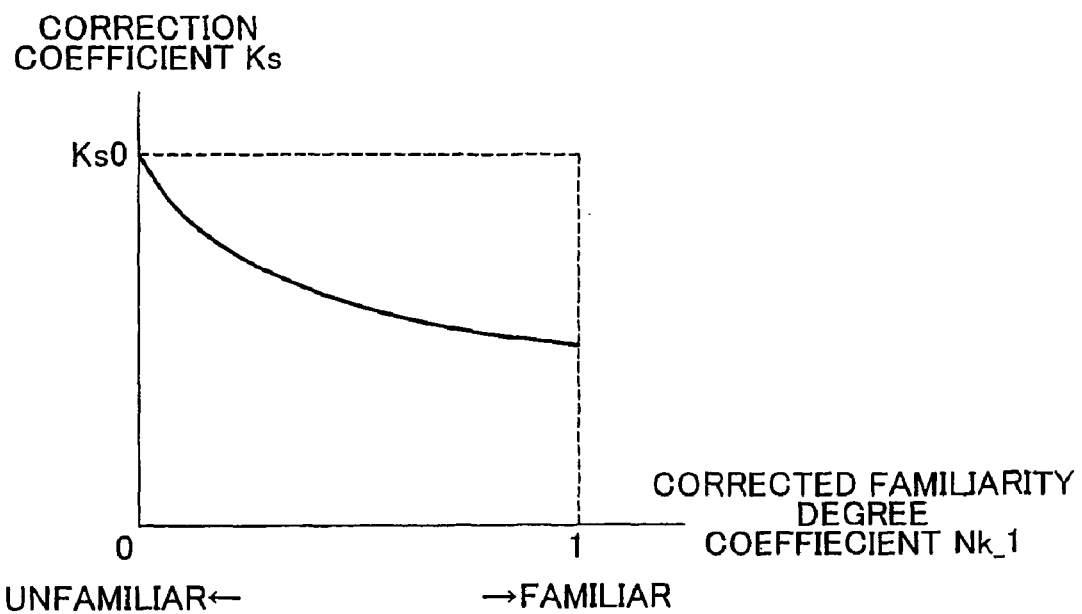
FIG. 10 is a graph showing a relation between the corrected familiarity degree coefficient and a correction coefficient for correcting the spring-term torque.
Figure 11:
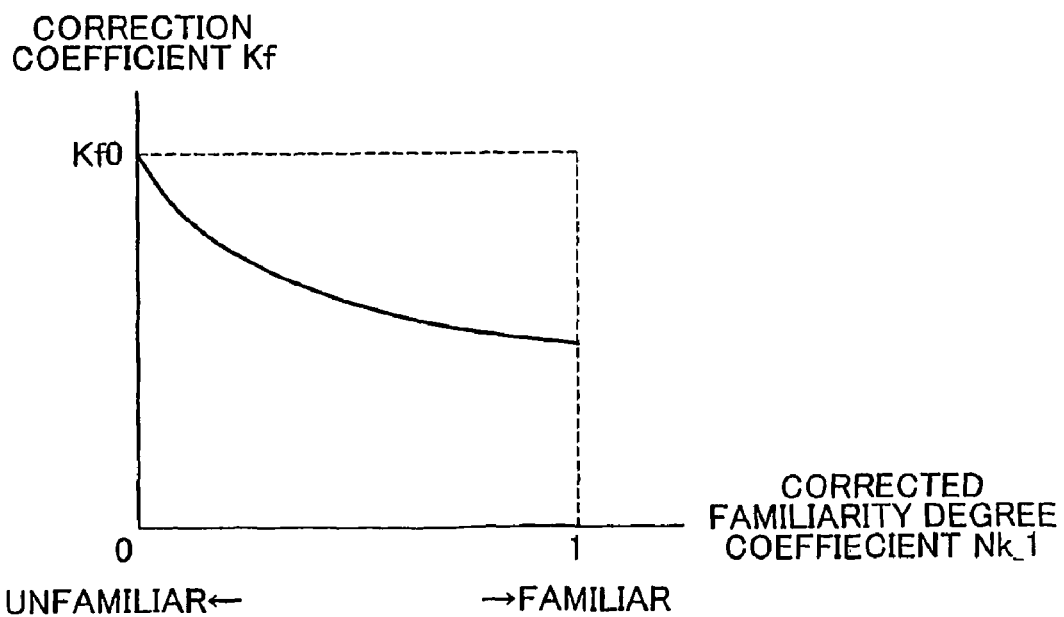
FIG. 11 is a graph showing a relation between the corrected familiarity degree coefficient and a correction coefficient for correcting the friction-term torque.
Figure 12:
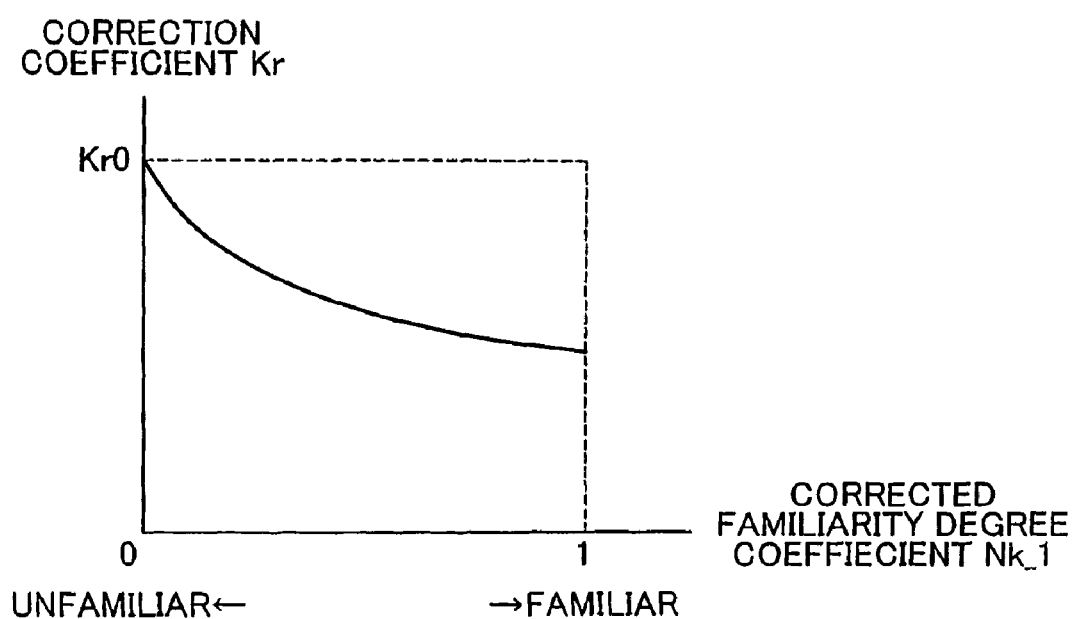
FIG. 12 is a graph showing a relation between the corrected familiarity degree coefficient and a correction coefficient for correcting the viscosity-term torque.

The coefficients Ks, Kf, and Kr in the expression 2 are correction coefficients that vary according to the corrected familiarity degree coefficient Nk_1 determined in step S14 or S15. More specifically, the correction coefficient Ks is a correction coefficient for correcting the spring-term torque Ts, and, as shown in FIG. 10, has a characteristic that the correction coefficient Ks increases up to a large value Ks0 as the corrected familiarity degree coefficient Nk_1 decreases, and it decreases as the corrected familiarity degree coefficient Nk_1 increases. The correction coefficient Kf is a correction coefficient for correcting the friction-term torque Tf, and, as shown in FIG. 11, has a characteristic that the correction coefficient Kf increases up to a large value Kf0 as the corrected familiarity degree coefficient Nk_1 decreases, and it decreases as the corrected familiarity degree coefficient Nk_1 increases. The correction coefficient Kr is a correction coefficient for correcting the viscosity-term torque Tr, and, as shown in FIG. 12, has a characteristic that the correction coefficient Kr increases up to a large value Kr0 as the corrected familiarity degree coefficient Nk_1 decreases, and it decreases as the corrected familiarity degree coefficient Nk_1 increases.

The electronic control unit 36 then calculates the desired reaction torque Tz corresponding to a corrected familiarity degree coefficient Nk_1 determined in step S14 or S15. Specifically, when the corrected familiarity degree coefficient Nk_1 is small, the electronic control unit 36 sets the correction coefficients Ks, Kf, and Kr to large values to increase the desired reaction torque Tz that is calculated in accordance with the expression 2. Thus, it is possible to impede that the steering wheel 11 is operated by a large amount by a driver who is unfamiliar with the steering characteristics of the steering-by-wire system. On the other hand, when the corrected familiarity degree coefficient Nk_1 is large, the electronic control unit 36 sets the correction coefficients Ks, Kf, and Kr to small values to reduce the desired reaction torque Tz that is calculated in accordance with the expression 2. Thus, a driver who is familiar with the steering characteristics of the steering-by-wire system is enabled to turn the steering wheel 11 with agility. After calculating the desired reaction torque Tz corresponding to a corrected familiarity degree coefficient Nk_1, the electronic control unit 36 proceeds to step S19.

In step S19, the electronic control unit 36 controls operation of the reaction force actuator 13 and the actual steering actuator 21, based on the desired actual steering angle δd calculated in step S16, the time constant τ set in step S17, and the desired reaction torque Tz calculated in step S18. First, the reaction force control will be specifically described below.

The electronic control unit 36 receives the value of the driving electric current flowing through the electric motor in the reaction force actuator 13 from the electric current detector 37a provided in the drive circuit 37, and controls the drive circuit 37 in a feedback manner so that the driving electric current corresponding to a desired reaction torque Tz flows through the electric motor. The control of driving of the electric motor in the reaction force actuator 13 causes the electric motor to apply a reaction force corresponding to the desired reaction torque Tz to the steering wheel 11 via the steering operation input shaft 12.

Next, the actual steering control will be specifically described. The electronic control unit 36 receives the actual steering angle δ detected by the actual steering angle sensor 32, and performs feedback control of rotation of the electric motor in the actual steering actuator 21 so that the actual steering output shaft 22 rotates to the desired actual steering angle δd calculated in step S16. At this time, the electronic control unit 36 receives the value of the driving electric current flowing through the electric motor in the actual steering actuator 21 from the electric current detector 38a provided in the drive circuit 38, and controls the drive circuit 38 in a feedback manner so that the driving electric current corresponding to the actual steering force appropriately flows through the electric motor.

The electronic control unit 36 controls the drive circuit 38 so that the electric motor in the actual steering actuator 21 produces driving force based on the time constant τ of the soft filter, or variable time constant filter, provided in the drive circuit 38, which time constant τ has been set in step S17. Thus, the pinion gear 23 integrated with the actual steering output shaft 22 rotates, and the rotation of the pinion gear 23 in turn causes the rack bar 24 to be displaced in the longitudinal direction. Then, the displacement of the rack bar 24 in the longitudinal direction causes the right and left front wheels FW1 and FW2 to be steered according to the desired actual steering angle δd.

In this way, control of operation of the reaction force actuator 13 and the actual steering actuator 21 by the electronic control unit 36 makes it possible for the reaction force actuator 13 to provide an appropriate reaction force against a turning operation of the steering wheel 11 by a driver, according to the corrected familiarity degree coefficient Nk_1 (the familiarity degree coefficient Nk_0). In addition, it is made possible for the actual steering actuator 21 to appropriately steer the right and left front wheels FW1 and FW2 according to the familiarity degree coefficient Nk_0. Thus, when the vehicle equipped with the steering system in which the steering-by-wire system is used, in other words, equipped with the steering system in which the steering operation input shaft 12 and the actual steering output shaft 22 can rotate relative to each other is driven, it is possible to provide the optimal actual steering characteristic and reaction force characteristic according to the driver's degree of familiarity with the steering characteristics, which enables a driver to very easily drive the vehicle without feeling a sense of discomfort accompanying a change of vehicles.

After controlling operation of the reaction force actuator 13 and the actual steering actuator 21 in step S19, the electronic control unit 36 proceeds to step S20. At step S20, the electronic control unit 36 temporarily ends the execution of the steering characteristic-changing program. After a predetermined short time period has elapsed, the electronic control unit 36 again starts to execute the steering characteristic-changing program at step S10 to cause the reaction force actuator 13 and the actual steering actuator 21 to operate according to the familiarity degree coefficient Nk_0 (corrected familiarity degree coefficient Nk_1).

As will be understood from the above description, according to the first embodiment, when a steering-by-wire steering system is operated, the familiarity degree coefficient Nk_0 indicating the degree of driver's familiarity with the steering characteristics can be determined based on the number of corrective turning operations of the steering wheel 11, the amount of change in the lateral acceleration G and the yaw rate γ, etc., which are physical quantities that vary according to the difference in the experience in operating the steering wheel 11, more specifically, the difference in the driving experience, such as the mileage over which and the drive time during which the driver drives a vehicle equipped with this steering system. In the case where a driver is unfamiliar with the steering characteristics, it is possible to make a switch to a reaction force characteristic that large reaction torque Tz is applied to impede that the steering handle 11 is operated by a large amount, and it is also possible to make a switch to an actual steering characteristic that the right and left front wheels FW1 and FW2 are gently steered. In addition, it is possible to control operation of the reaction force actuator 13 and the actual steering actuator 21 based on the changed steering characteristics. Thus, it is possible to set appropriate steering characteristics in accordance with the driver's familiarity with the steering characteristics, which enables a driver to easily drive the vehicle.

Second Embodiment

Next, a second embodiment will be described, in which the actual steering characteristic and the reaction force characteristic, that is, the steering characteristics of the steering-by-wire system are optimally changed, taking the degree of familiarity with the steering characteristics that varies depending on the driver driving the vehicle into consideration. In the above first embodiment, the familiarity degree coefficient Nk_0 indicating a general degree of driver's familiarity with the steering characteristics of the steering-by-wire system is estimated and determined, and the actual steering characteristic and the reaction force characteristic are changed based on the familiarity degree coefficient Nk_0. However, because the occasions to drive a vehicle vary depending on the driver, there is a possibility that, even when the value of the familiarity degree coefficient Nk_0 becomes large when a driver is temporarily familiar with the steering characteristics, if the interval before the next driving of the vehicle is long, the familiarity degree coefficient Nk_0 again becomes small, that is, the driver becomes unfamiliar with the steering characteristics. For this reason, in the second embodiment, the familiarity degree coefficient Nk_0 is determined according to the status of each individual driver. In the description of the second embodiment, the same part as that of the first embodiment is designated by the same reference numeral, and detailed description thereof will be omitted.

Figure 13:
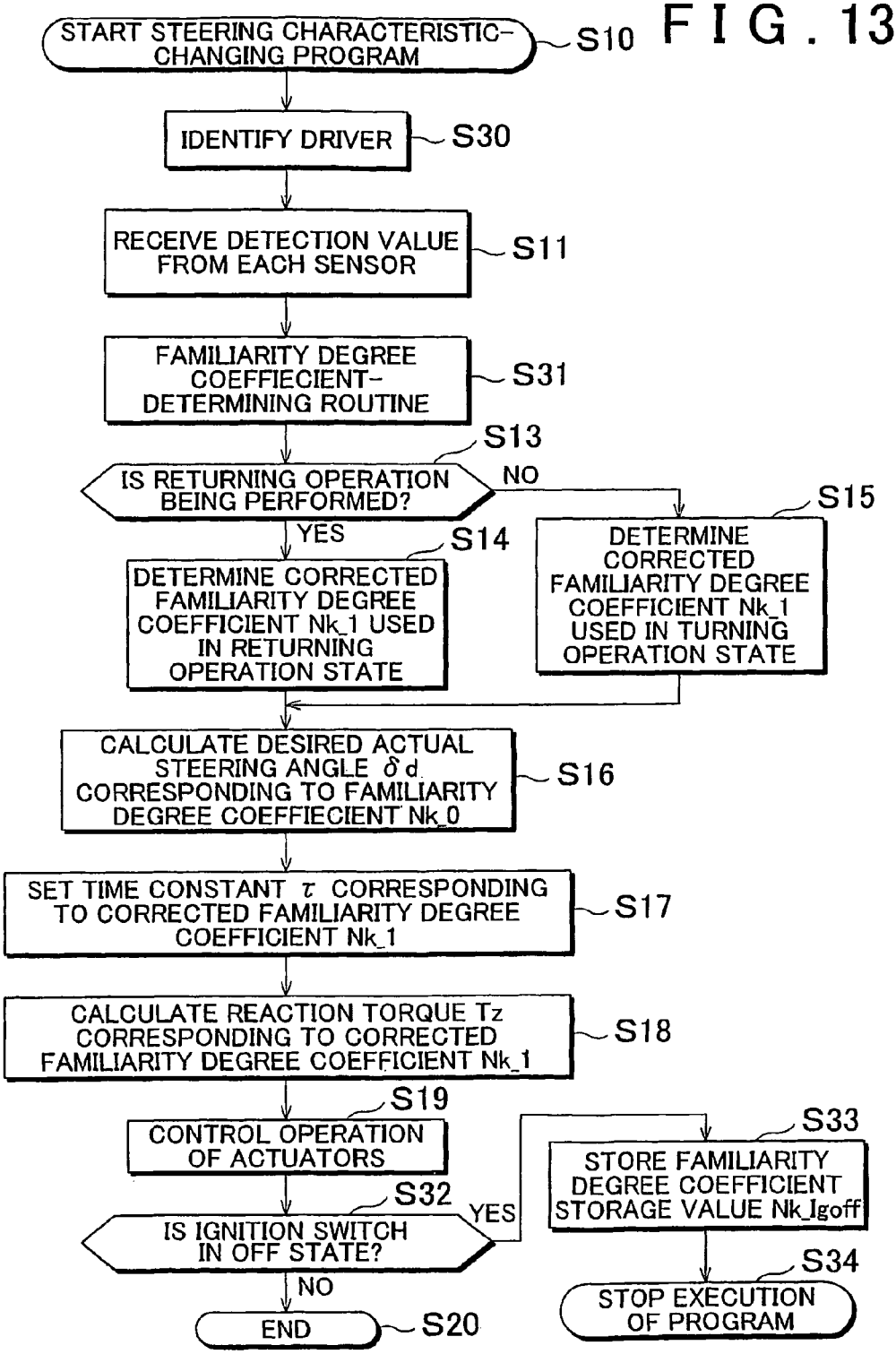
FIG. 13 is a flow chart illustrating a steering characteristic-changing program, which is executed by the electronic control unit show in FIG. 1, according to the second embodiment of the present invention.

In the second embodiment, the electronic control unit 36 executes a steering characteristic-changing program shown in FIG. 13. In the steering characteristic-changing program of the second embodiment, steps S30, S32, S33, and S34 are added to the steering characteristic-changing program described in connection with the first embodiment, and step S12 is changed to step S31. Specifically, when the ignition switch (not shown) is turned on, the electronic control unit 36 starts to execute the steering characteristic-changing program according to the second embodiment from step S10 repeatedly every predetermined short time. In step S30, the electronic control unit 36 identifies a driver who is driving the vehicle.

Specifically, in order to identify the in-vehicle driver, the electronic control unit 36 receives, via a receiver (not shown), information with which it is possible to identify a driver, such as an identification radio signal sent from a cellular phone carried by the driver, an identification radio signal sent from a smart key carried by the driver, or an identification radio signal sent from an ignition key assigned to the driver. In order to determine whether there has been a change in drivers by the time of turning on the ignition switch, the electronic control unit 36 receives the vehicle speed V detected by the vehicle speed sensor 33, vehicle height information indicating the height of the vehicle detected via vehicle height sensors mounted on the suspension devices of the vehicle (not shown), occupancy information output from an occupancy detection sensor installed in a seat (not shown), open/close information output from an open/close detection sensor installed in a door (not shown), etc.

When it is determined that there has been a change in drivers, the electronic control unit 36 then compares driver identification information represented by the received identification radio signal with, for example, driver registration information that has been recorded in the EEPROM in advance, for example. Based on this comparison, the electronic control unit 36 identifies the driver who is driving the vehicle. Needless to say, the present invention may be implemented so that, only when it is determined that there has been a change in drivers based on the detected vehicle speed V, the vehicle height information, the occupancy information, or the open/close information, the electronic control unit 36 identifies a driver by performing step S30 when the ignition switch is turned off. After the driver is identified, the electronic control unit 36 receives a detection value supplied from each sensor by the performing step S11 as in the case of the first embodiment, and proceeds to step S31.

In step S31, the electronic control unit 36 executes a familiarity degree coefficient-determining routine for determining the familiarity degree coefficient Nk_0 of the driver identified in step S30. The familiarity degree coefficient-determining routine will be specifically described below.

Figure 14:
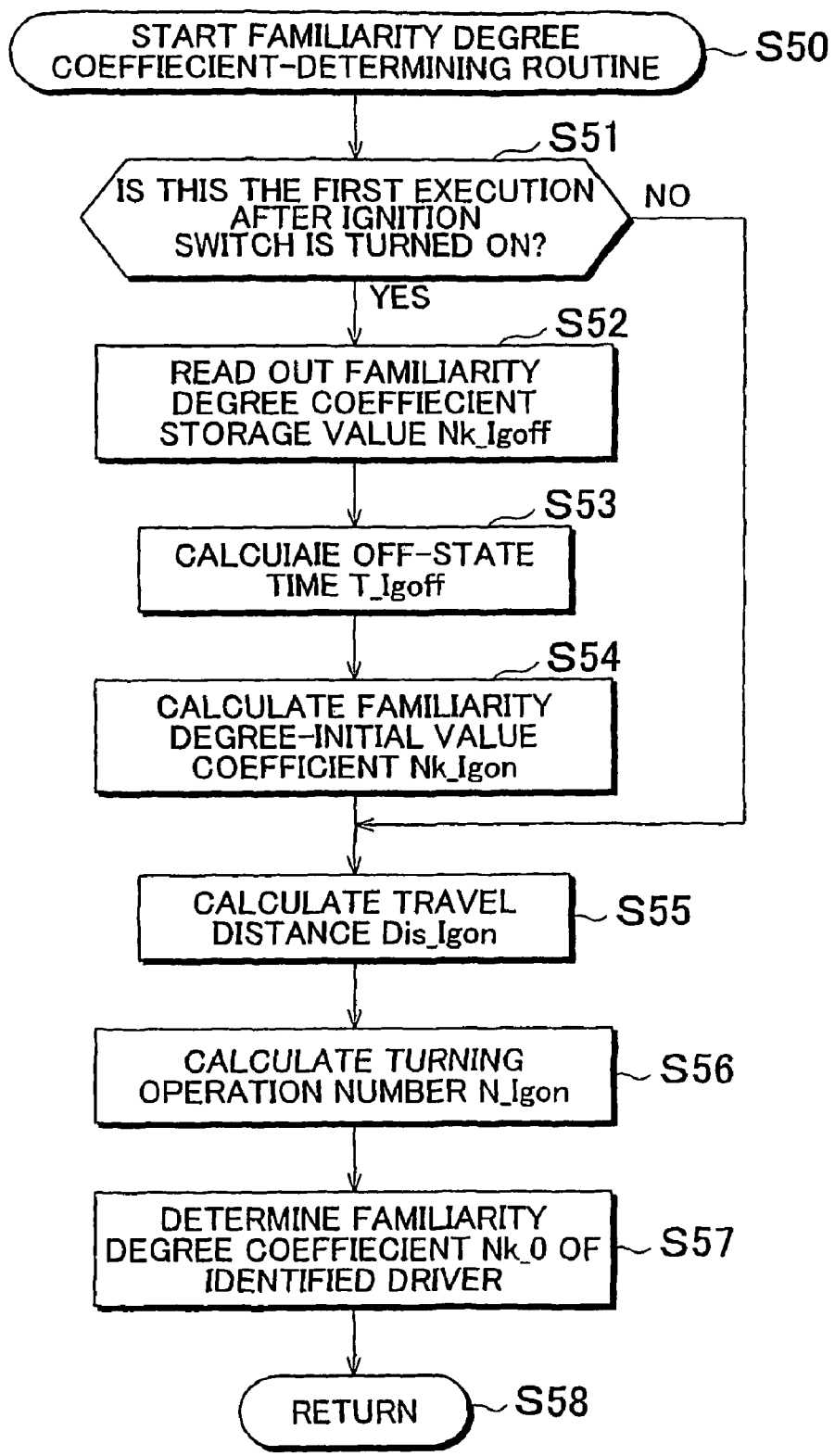
FIG. 14 is a flow chart illustrating a familiarity degree coefficient-determining routine of the steering characteristic-changing program shown in FIG. 13.

As shown in FIG. 14, execution of the familiarity degree coefficient-determining routine is started at step S50, and, in step S51, the electronic control unit 36 determines whether the current execution of the familiarity degree coefficient-determining routine is the first execution after the ignition switch is turned on. Specifically, when the execution of the familiarity degree coefficient-determining routine is the first execution, the electronic control unit 36 makes an affirmative determination (YES), and proceeds to step S52. On the other hand, when the current execution of the familiarity degree coefficient-determining routine is the second or later execution, the electronic control unit 36 makes a negative determination (NO), and proceeds to step S55 described later.

In step S52, the electronic control unit 36 reads out a stored value of the familiarity degree coefficient Nk_0 that was stored at a predetermined location in the EEPROM, for example, (hereinafter the stored value is referred to as the familiarity degree coefficient storage value Nk_Igoff) when the ignition switch was turned off last time, in relation to the driver identified in step S30 of the steering characteristic-changing program. When the familiarity degree coefficient storage value Nk_Igoff is stored, the electronic control unit 36 also stores time information indicating the time of storage. Storage of the familiarity degree coefficient storage value Nk_Igoff into the EEPROM will be described in detail later. After reading out the familiarity degree coefficient storage value Nk_Igoff in this way, the electronic control unit 36 proceeds to step S53.

In step S53, the electronic control unit 36 calculates the elapsed time (hereinafter the elapsed time is referred to as the off-state time T_Igoff) between when the ignition switch was turned off last time and when the ignition switch is turned on this time by the driver identified in step S30. Specifically, the electronic control unit 36 compares ignition switch-turned off time point that is indicated by the time information stored along with the familiarity degree coefficient storage value Nk_Igoff read out in step S52, and ignition switch-turned on time point at which the ignition switch is turned on. Thereafter, the electronic control unit 36 calculates the off-state time T_Igoff that is the time period between when the ignition switch was turned off last time and when the ignition switch is turned on this time, based on the difference between the ignition switch-turned off time and the ignition switch-turned on time. After calculating the off-state time T_Igoff in this way, the electronic control unit 36 proceeds to step S54.

In step S54, the electronic control unit 36 calculates the initial value (hereinafter, the initial value is referred to as the familiarity degree-initial value coefficient Nk_Igon) of the familiarity degree coefficient at the time when the ignition switch is turned on this time, in accordance with the following expression 3.

$$Nk\_Igon = Nk\_Igoff \cdot K\_time \quad \text{(Expression 3)}$$

Figure 15:
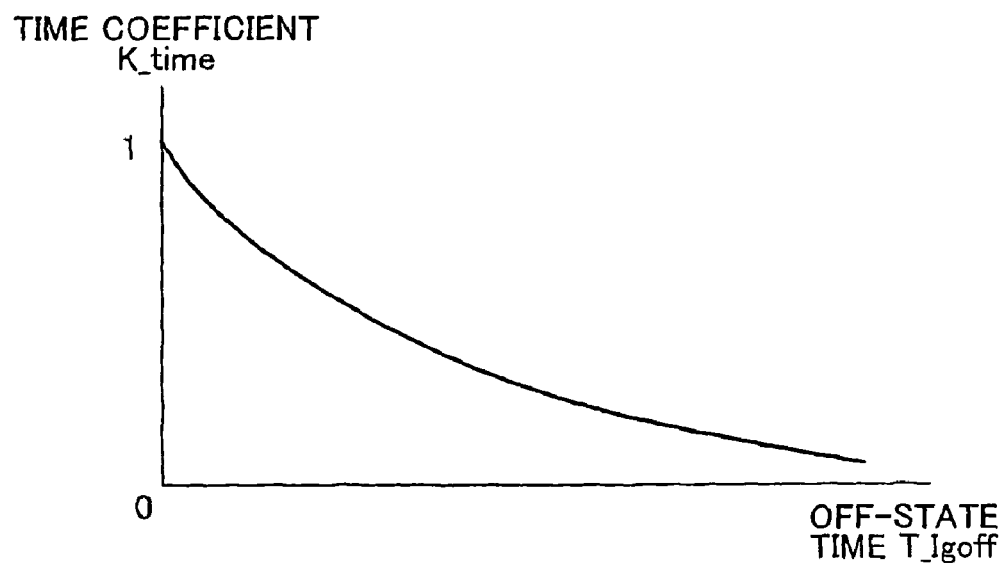
FIG. 15 is a graph showing a relation between off-state time and a time coefficient.

In the expression 3, the coefficient K_time is a time coefficient that varies according to the off-state time T_Igoff. The coefficient K_time has a characteristic that the coefficient K_time nonlinearly decreases from "1" as the off-state time T_Igoff increases, as shown in FIG. 15, for example. After calculating the familiarity degree-initial value coefficient Nk_Igon, the electronic control unit 36 proceeds to step S55. A driver himself/herself may set the value of the familiarity degree-initial value coefficient Nk_Igon by operating an adjustment switch disposed near the driver's seat, for example.

In step S55, the electronic control unit 36 calculates a travel distance Dis_Igon over which the vehicle has traveled since the ignition switch is turned on. Specifically, the electronic control unit 36 calculates the travel distance Dis_Igon by integrating the detected vehicle speed V received from the vehicle speed sensor 33 in step S11 of the steering characteristic-changing program with respect to travel time. When the travel distance Dis_Igon is calculated, the calculation may be performed using the value indicated by a tripmeter installed in the vehicle, for example. After calculating the travel distance Dis_Igon, the electronic control unit 36 proceeds to step S56.

In step S56, the electronic control unit 36 calculates a turning operation number N_Igon by which the steering wheel 11 has been turned by a driver since the ignition switch is turned on. Specifically, the electronic control unit 36 compares the absolute value of the detected steering angle θ received from the steering operation angle sensor 31 in step S11 of the steering characteristic-changing program, and the predetermined value that has been set in advance to determine whether a turning operation of the steering wheel 11 has been performed. Concerning the state of the turning operation of the steering wheel 11, the electronic control unit 36 counts the number of times the absolute value of the detected steering operation angle θ changes from a value equal to or less than the predetermined value to a value larger than the predetermined value, and uses the count value as the turning operation number N_Igon. After calculating the turning operation number N_Igon in this way, the electronic control unit 36 proceeds to step S57.

In step S57, the electronic control unit 36 calculates the familiarity degree coefficient Nk_0 of the identified driver. Specifically, the electronic control unit 36 calculates the familiarity degree coefficient Nk_0 in accordance with the following expression 4 using the familiarity degree-initial value coefficient Nk_Igon calculated in step S54, the travel distance Dis_Igon calculated in step S55, and the turning operation number N_Igon calculated in step S56.

$$Nk\_0 = Nk\_Igon + K\_dis \cdot Dis\_Igon + K\_N \cdot N\_Igon \quad \text{(Expression 4)}$$

In the expression 4, K_dis and K_N are preset, small positive constants.

Thus, the larger the familiarity degree-initial value coefficient Nk_Igon is, the closer to "1" the result of calculation of the familiarity degree coefficient Nk_0 calculated in accordance with the expression 4 is. Specifically, as shown by the expression 3, the familiarity degree-initial value coefficient Nk_Igon is calculated based on the time coefficient K_time that is set so that the larger the off-state time T_Igoff is, the smaller value the time coefficient K_time has. In other words, the shorter the period between the end of the preceding drive of the vehicle and the start of the current drive of the vehicle is, the larger the result of calculation of the familiarity degree-initial value coefficient Nk_Igon is to some extent; on the other hand, the longer this period is, the smaller the result of calculation of the familiarity degree-initial value coefficient Nk_Igon is. Thus, even in the case of a driver who is familiar with the steering characteristics of the steering-by-wire system owing to the driving experience that has been accumulated until the preceding drive, when the off-state time T_Igoff is long, the familiarity degree coefficient Nk_0 is temporarily made closer to "0", so that it is possible to reduce the chances of feeling a sense of discomfort with the steering characteristics.

The longer the travel distance Dis_Igon is, the closer to "1" the result of calculation of the familiarity degree coefficient Nk_0 that is calculated in accordance with the above expression 4 is. Specifically, the longer the travel distance Dis_Igon is in the current drive of the vehicle, the closer to "1" the result of calculation of the familiarity degree coefficient Nk_0 is because the driver becomes familiar with the steering characteristics of the steering-by-wire system. In addition, the larger the turning operation number N_Igon of the steering wheel 11 is, the closer to "1" the result of calculation of the familiarity degree coefficient Nk_0 that is calculated in accordance with the above expression 4 is. Specifically, the larger the turning operation number N_Igon of the steering wheel 11 is, the closer to "1" the result of calculation of the familiarity degree coefficient Nk_0 is because the driver becomes familiar with the steering characteristics of the steering-by-wire system.

Figure 16:
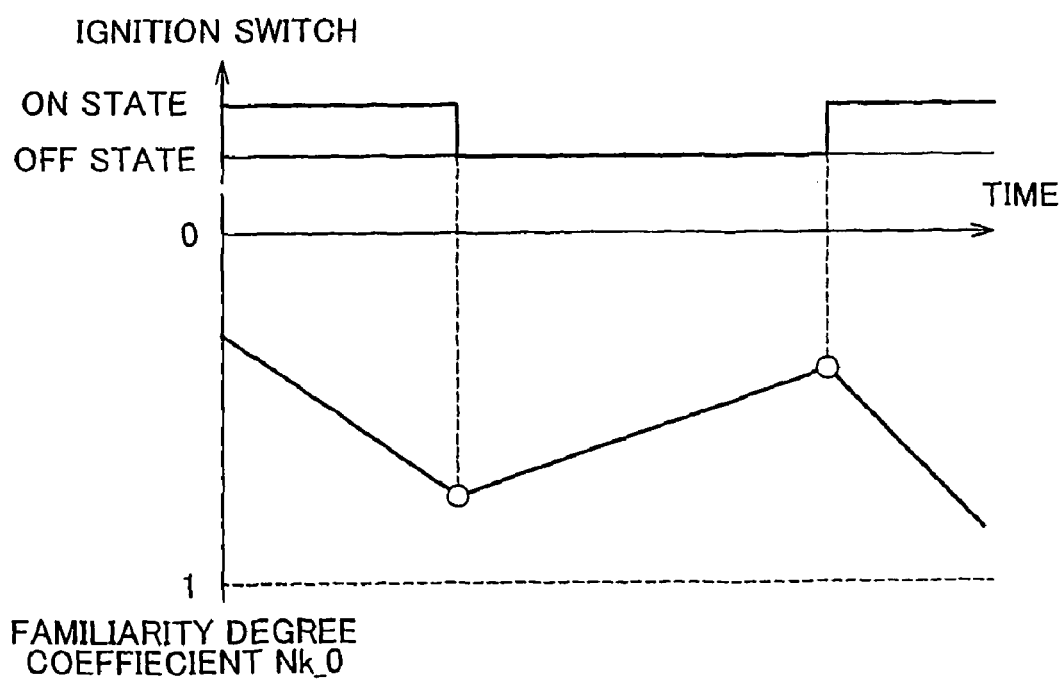
FIG. 16 is a diagram for explaining the familiarity degree coefficient that varies according to the operational state of an ignition switch.

Thus, when the familiarity degree-initial value coefficient Nk_Igon is calculated according to the off-state time T_Igoff, and the familiarity degree coefficient Nk_0 is calculated, taking the travel distance Dis_Igon and the turning operation number N_Igon into consideration, the longer the travel distance Dis_Igon is and the larger the turning operation number N_Igon is, that is, the longer the time period during which the ignition switch is in an on state, the closer to "1" the familiarity degree coefficient Nk_0 becomes as shown in FIG. 16. Thus, the driver becomes familiar with the steering characteristics of the steering-by-wire system as the driver drives the vehicle and performs steering operation of the steering wheel 11. After calculating the familiarity degree coefficient Nk_0, the electronic control unit 36 temporarily exits the execution of the familiarity degree coefficient-determining routine at step S58.

Returning back to the description of the steering characteristic-changing program according to the second embodiment, the electronic control unit 36 performs the processes of steps S13 through S19 of the steering characteristic-changing program, using the calculated familiarity degree coefficient Nk_0, as in the case of the above-described first embodiment. Thus, it is possible to change the actual steering characteristic and the reaction force characteristic in accordance with the degree of driver's familiarity with the steering characteristics of the steering-by-wire system as in the case of the above-described first embodiment. After performing the process of step S19, the electronic control unit 36 proceeds to step S32.

In step S32, the electronic control unit 36 determines whether the ignition switch has been turned off by the driver. Specifically, when the ignition switch is maintained in an on state, the electronic control unit 36 makes a negative determination (No), proceeds to step S20, and temporarily ends the execution of the steering characteristic-changing program. After the predetermined short period of time has elapsed, the electronic control unit 36 again starts to execute the same program at step S10.

On the other hand, when the ignition switch is turned off by the driver, the electronic control unit 36 makes an affirmative determination (YES), and proceeds to step S33. In step S33, the electronic control unit 36 executes a predetermined termination program (not shown), stores, as the familiarity degree coefficient storage value Nk_Igoff, the familiarity degree coefficient Nk_0 at the time when the ignition switch is turned off, at the predetermined location in the EEPROM, and also stores the time information indicating the time at which the ignition switch is turned off. In this case, the electronic control unit 36 stores the driver registration information, which is used to identify the driver identified in step S30, and the familiarity degree coefficient storage value Nk_Igoff and the time information with these pieces of information associated with each other. The electronic control unit 36 then proceeds to step S34, and completely exits the execution of the steering characteristic-changing program.

As will be understood from the above description, according to the second embodiment, it is possible to set the appropriate familiarity degree coefficient Nk_0 for each driver who drives the vehicle. Thus, it is possible to change the steering characteristics to optimal characteristics based on the familiarity degree coefficient Nk_0 of a driver, so that a driver can drive the vehicle more easily. In addition, it is possible to correct the familiarity degree coefficient Nk_0, taking the interval between drives of the vehicle by the same driver into consideration. With regard to the correction of the familiarity degree coefficient Nk_0, it is possible to correct the familiarity degree coefficient Nk_0 so that the longer the interval between drives of the vehicle by the same driver is, the closer to "0" the familiarity degree coefficient Nk_0 becomes to indicate that the driver is unfamiliar with the steering characteristics. Thus, although there is a possibility that, even in the case where a driver once becomes familiar with the steering characteristics, the driver feels a sense of discomfort with the steering characteristics if the driver has not driven the vehicle for a long period of time, for example, it is possible to make a switch to the steering characteristics according to the current degree of driver's familiarity with the steering characteristics by correcting the familiarity degree coefficient Nk_0 based on the period of time for which the driver has not driven the vehicle. Thus, even in such a case, a driver can easily drive the vehicle. Other advantageous effects are similar to those of the above first embodiment.

Third Embodiment

Next, a third embodiment of the present invention will be described. Also in the third embodiment, the actual steering characteristic and the reaction force characteristic of the steering-by-wire system are appropriately changed, taking the degree of familiarity with the steering characteristics of the driver driving the vehicle into consideration as in the case of the second embodiment. It should be noted that the familiarity degree coefficient-determining routine used in the third embodiment is different from the familiarity degree coefficient-determining routine described in connection with the above second embodiment. The familiarity degree coefficient-determining routine used in the third embodiment will be described in detail below. With regard to other elements, because these elements are similar to those of the second embodiment, the elements are designated by the same reference numerals, and detailed description thereof will be omitted.

Also in the third embodiment, the electronic control unit 36 executes an actual steering control program shown in FIG. 13 as in the case of the above second embodiment. Specifically, when the ignition switch (not shown) is turned on, the electronic control unit 36 executes the steering characteristic-changing program from step S10 repeatedly every predetermined short time. In step S30, as in the case of the above second embodiment, the electronic control unit 36 identifies a driver who is driving the vehicle. Thereafter, the electronic control unit 36 receives a detection value from each sensor in step S11, and then executes the familiarity degree coefficient-determining routine in step S31.

The familiarity degree coefficient-determining routine according to the third embodiment determines the familiarity degree coefficient Nk_0 based on the turning state of the vehicle that varies according to the state of the turning operation of the steering wheel 11 by a driver. The familiarity degree coefficient-determining routine according to the third embodiment will be specifically described below.

Figure 17:
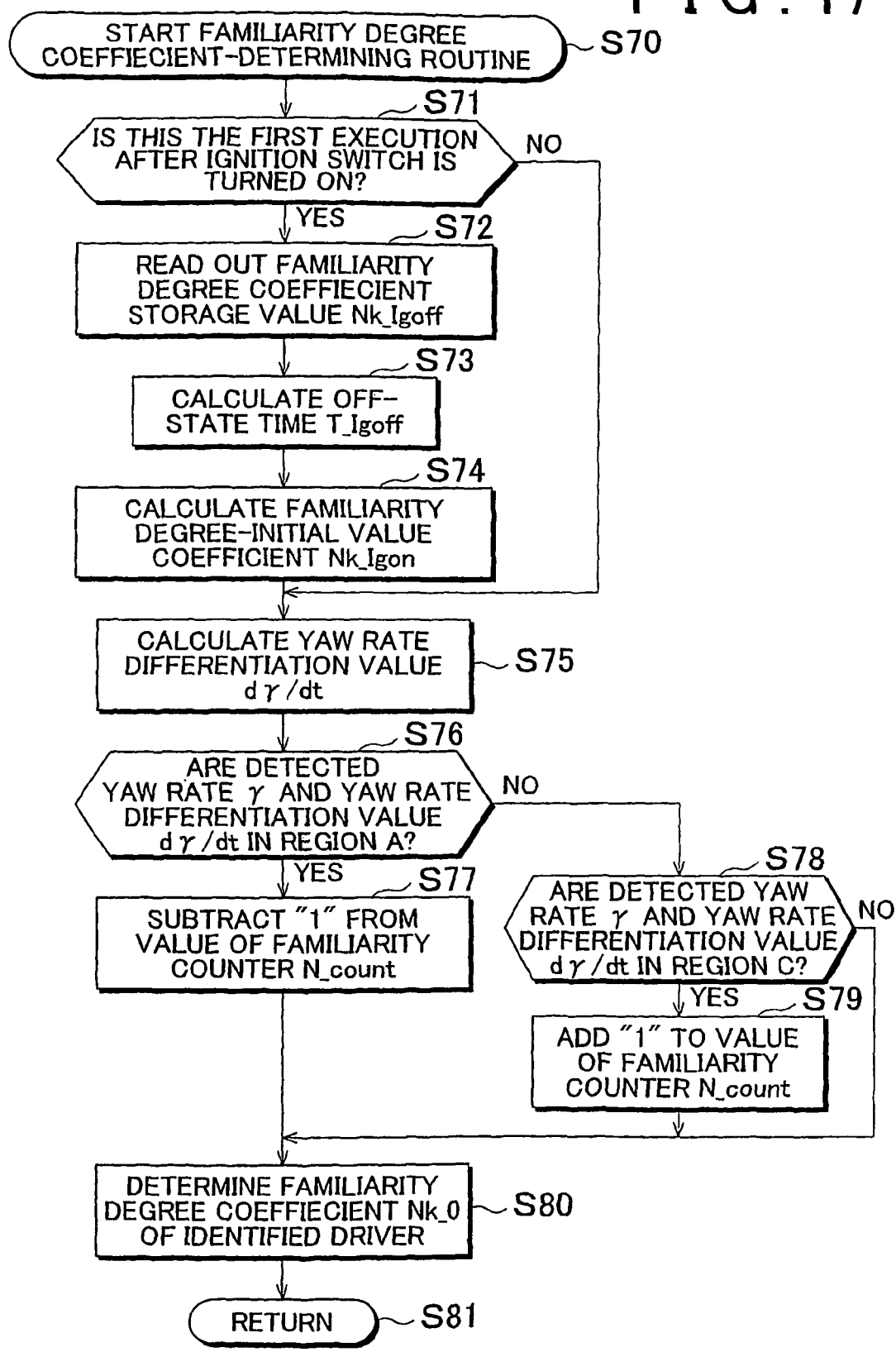
FIG. 17 is a flow chart illustrating a familiarity degree coefficient-determining routine, which is executed by the electronic control unit shown in FIG. 1, according to the third embodiment of the present invention.

As shown in FIG. 17, execution of the familiarity degree coefficient-determining routine is started at step S70, and, in step S71, the electronic control unit 36 determines whether the current execution of the familiarity degree coefficient-determining routine is the first execution after the ignition switch is turned on. Specifically, when the execution of the familiarity degree coefficient-determining routine is the first execution, the electronic control unit 36 makes an affirmative determination (YES), and proceeds to step S72. On the other hand, when the current execution of the familiarity degree coefficient-determining routine is the second or a subsequent execution, the electronic control unit 36 makes a negative determination (NO), and proceeds to step S75.

In step S72, the electronic control unit 36 reads out the familiarity degree coefficient storage value Nk_Igoff that was stored at a predetermined location in the EEPROM when the ignition switch was turned off last time, in relation to the driver identified in step S30 of the steering characteristic-changing program. After reading out the familiarity degree coefficient storage value Nk_Igoff in this way, the electronic control unit 36 proceeds to step S73.

In step S73, the electronic control unit 36 calculates the off-state time T_Igoff between when the ignition switch was turned off last time and when the ignition switch is turned on this time. Calculation of the off-state time T_Igoff is similar to that in step S53 of the familiarity degree coefficient-determining routine used in the above-described second embodiment, and detailed description thereof will therefore be omitted. After calculating the off-state time T_Igoff, the electronic control unit 36 proceeds to step S74.

In step S74, the electronic control unit 36 calculates the familiarity degree-initial value coefficient Nk_Igon in accordance with the above expression 3 as in the case of the step S54 of the familiarity degree coefficient-determining routine used in the above-described second embodiment. Needless to say, also in this case, a driver himself/herself can appropriately set the value of the familiarity degree-initial value coefficient Nk_Igon by operating the adjustment switch. After calculating the familiarity degree-initial value coefficient Nk_Igon, the electronic control unit 36 proceeds to step S75.

In step S75, the electronic control unit 36 calculates the time derivative value of the detected yaw rate dγ/dt (hereinafter, the time derivative value is referred to as the yaw rate differentiation value dγ/dt) received from the yaw rate sensor 35 in step S1. After calculating the yaw rate differentiation value dγ/dt, the electronic control unit 36 proceeds to step S76.

In step S76, and step S78 described later, the electronic control unit 36 determines which region in a region determination map shown in FIG. 18 the point determined by the absolute value of the detected yaw rate γ received in step S11 and the absolute value of the yaw rate differentiation value dγ/dt calculated in step S71 is in. The region determination map will now be described.

Figure 18:
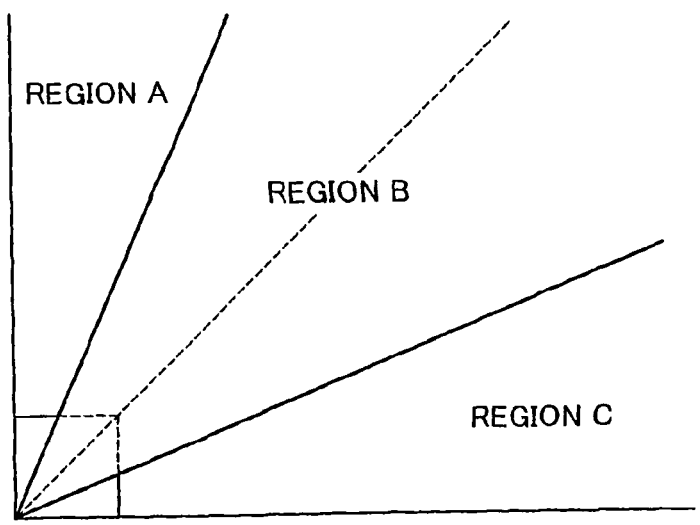
FIG. 18 is a schematic graph showing a region determination map.

The region determination map includes three regions, that is, the region A, the region B, and the region C as shown in FIG. 18. The region A is a region in which the amount of change in the absolute value of the yaw rate differentiation value dγ/dt is large relative to the amount of change in the absolute value of the detected yaw rate γ, and in which the vehicle is jerkily turned in response to a turning operation of the steering wheel 11 by a driver. The region C is a region in which the amount of change in the absolute value of the yaw rate differentiation value dγ/dt is small relative to the amount of change in the absolute value of the detected yaw rate γ, and in which the vehicle is smoothly turned in response to a turning operation of the steering wheel 11 by a driver. The region B is a region in which the amount of change in the absolute value of the yaw rate differentiation value dγ/dt relative to the amount of change in the absolute value of the detected yaw rate γ is almost intermediate between the change amount in the region A and the change amount in the region C. The region determination map is previously stored at a predetermined location in the EEPROM, for example.

Then, in step S76, the electronic control unit 36 determines whether the point determined by the absolute value of the detected yaw rate γ and the absolute value of the yaw rate differentiation value dγ/dt is in the region A in the region determination map, in other words, whether the vehicle is jerkily turned in response to a turning operation of the steering wheel 11 by the driver. When it is determined using the region determination map shown in FIG. 18 that the point determined by the absolute value of the detected yaw rate γ and the absolute value of the yaw rate differentiation value dγ/dt is in the region A, the electronic control unit 36 makes an affirmative determination (Yes), and proceeds to step S77.

In step S77, the electronic control unit 36 subtracts "1" from the value of the familiarity counter N_count that varies depending on the region in which the point determined by the absolute value of the detected yaw rate γ and the absolute value of the yaw rate differentiation value dγ/dt is, and that is added to the familiarity degree-initial value coefficient Nk_Igon calculated in step S74. When the point determined by the absolute value of the detected yaw rate γ and the absolute value of the yaw rate differentiation value dγ/dt is in the region A, the vehicle is jerkily turned in response to a turning operation of the steering wheel 11 by the driver. The probability of occurrence of such a state in which the vehicle is jerkily turned is high when a driver is unfamiliar with the steering characteristics of the steering-by-wire system.

Thus, the electronic control unit 36 subtracts "1" from the value of the familiarity counter N_count to reduce the value of the familiarity degree coefficient Nk_0 calculated as described later. The familiarity counter N_count is a counter value that is initialized when the ignition switch is turned on, and whose minimum value is "0". After subtracting "1" from the value of the familiarity counter N_count, the electronic control unit 36 proceeds to step S80.

On the other hand, when the point determined by the absolute value of the detected yaw rate γ and the absolute value of the yaw rate differentiation value dγ/dt is not in the region A in the region determination map, the electronic control unit 36 makes a negative determination (No), and proceeds to step S78. In step S78, the electronic control unit 36 determines whether the point determined by the absolute value of the detected yaw rate γ and the absolute value of the yaw rate differentiation value dγ/dt is in the region C, in other words, whether a state in which the vehicle is smoothly turned is realized. Specifically, when it is determined using the region determination map shown in FIG. 18 that the point determined by the absolute value of the detected yaw rate γ and the absolute value of the yaw rate differentiation value dγ/dt is in the region C, the electronic control unit 36 makes an affirmative determination (Yes), and proceeds to step S79.

In step S79, the electronic control unit 36 adds "1" to the value of the familiarity counter N_count. When the point determined by the absolute value of the detected yaw rate γ and the absolute value of the yaw rate differentiation value dγ/dt is in the region C, the vehicle is smoothly turned in response to a turning operation of the steering wheel 11 by the driver. Such a state in which the vehicle is smoothly turned occurs when a driver is familiar with the steering characteristics of the steering-by-wire system. Thus, the electronic control unit 36 adds "1" to the value of the familiarity counter N_count to increase the value of the familiarity degree coefficient Nk_0 calculated as described later. After adding "1" to the value of the familiarity counter N_count, the electronic control unit 36 proceeds to step S80.

On the other hand, when the point determined by the absolute value of the detected yaw rate γ and the absolute value of the yaw rate differentiation value dγ/dt is not in the region C, in other words, when the point determined by the absolute value of the detected yaw rate γ and the absolute value of the yaw rate differentiation value dγ/dt is in the region B in the region determination map, the electronic control unit 36 makes a negative determination (No), and proceeds to step S80. When the point determined by the absolute value of the detected yaw rate γ and the absolute value of the yaw rate differentiation value dγ/dt is in the region B in the region determination map, a driver is not unfamiliar with the steering characteristics of the steering-by-wire system, and at the same time, not sufficiently familiar with the steering characteristics. Thus, neither addition to nor subtraction from the value of the familiarity counter N_count is performed by the electronic control unit 36, and the electronic control unit 36 proceeds to step S80.

With regard to the region determination process in steps 76 and 78, when both the absolute value of the detected yaw rate γ and the absolute value of the yaw rate differentiation value dγ/dt are small, in other words, when the vehicle moves substantially straight ahead, the electronic control unit 36 does not perform the region determination process. The reason why the region determination process is not performed is because, when the vehicle moves substantially straight ahead, the steering wheel 11 is not actively turned by a driver, and therefore, there is no need to determine whether or not the driver is familiar with the steering characteristics of the steering-by-wire system.

In step S80, the electronic control unit 36 calculates the familiarity degree coefficient Nk_0 of the identified driver. Specifically, the electronic control unit 36 calculates the familiarity degree coefficient Nk_0 in accordance with the following expression 5 using the familiarity degree-initial value coefficient Nk_Igon calculated in step S74, and the value of the familiarity counter N_count that is decremented in step S77 or incremented in step S79.

$$Nk\_0 = Nk\_Igon + K\_count \cdot N\_count \quad \text{(Expression 5)}$$

It should be noted that K_count in the expression 5 is a preset, small positive constant.

Thus, the larger the familiarity degree-initial value coefficient Nk_Igon is, the closer to "1" the result of calculation of the familiarity degree coefficient Nk_0 calculated in accordance with the expression 5 is. Specifically, as shown by the expression 3, the familiarity degree-initial value coefficient Nk_Igon is calculated based on the time coefficient K_time that is set so that the larger the off-state time T_Igoff is, the smaller value the time coefficient K_time has. In other words, the shorter the period between the end of the preceding drive of the vehicle and the start of the current drive of the vehicle is, the larger the result of calculation of the familiarity degree-initial value coefficient Nk_Igon is to some extent; on the other hand, the longer this period is, the smaller the result of calculation of the familiarity degree-initial value coefficient Nk_Igon is. Thus, even in the case of a driver who is familiar with the steering characteristics of the steering-by-wire system owing to the driving experience that has been accumulated until the preceding drive, when the off-state time T_Igoff is long, the familiarity degree coefficient Nk_0 is temporarily made closer to "0", so that it is possible to reduce the chances of feeling a sense of discomfort with the steering characteristics.

The larger the familiarity counter N_count is, the closer to "1" the result of calculation of the familiarity degree coefficient Nk_0 that is calculated in accordance with the above expression 5 is. Specifically, the more smoothly the vehicle is turned in the current drive of the vehicle, the closer to "1" the result of calculation of the familiarity degree coefficient Nk_0 is because the driver is familiar with the steering characteristics of the steering-by-wire system.

Thus, when the familiarity degree-initial value coefficient Nk_Igon is calculated according to the off-state time T_Igoff, and the familiarity degree coefficient Nk_0 is calculated, taking the value of the familiarity counter N_count into consideration, the familiarity degree coefficient Nk_0 is caused to vary, reflecting the manner in which the vehicle is actually turned by the driver. After calculating the familiarity degree coefficient Nk_0, the electronic control unit 36 temporarily exits the execution of the familiarity degree coefficient-determining routine at step S81.

When the electronic control unit 36 temporarily ends the execution of the familiarity degree coefficient-determining routine, the electronic control unit 36 executes the steering characteristic-changing program as in the case of the first and second embodiments. Therefore, description thereof will be omitted.

As will be understood from the above description, according to the third embodiment, it is possible to determine the familiarity degree coefficient Nk_0 based on the absolute value of the detected yaw rate γ and the absolute value of the yaw rate differentiation value dγ/dt. Thus, it is possible to more accurately determine the familiarity degree coefficient Nk_0 indicating the degree of driver's familiarity with the steering characteristics, and as a result, it is possible to set appropriate steering characteristics for the driver. Accordingly, the driver can more easily drive the vehicle. Other advantageous effects are similar to those of the above first embodiment.

In this embodiment, the present invention is implemented so that it is determined which region in the region determination map the point determined by the absolute value of the detected yaw rate γ and the absolute value of the yaw rate differentiation value dγ/dt is in, in steps S76 and S78 of the above-described familiarity degree coefficient-determining routine. Alternatively, the present invention may be implemented so that it is determined which region in the region determination map shown in FIG. 18 the point determined by the absolute value of detected lateral acceleration G detected by the lateral acceleration sensor 34 and the absolute value of the time derivative dG/dt of the detected lateral acceleration G (hereinafter, the derivative value is referred to as the lateral jerk dG/dt) is in.

Also in this case, when the point determined by the absolute value of the detected lateral acceleration G and the absolute value of the lateral jerk dG/dt is in the region A, it is possible to determine that the vehicle is jerkily turned in response to a turning operation of the steering wheel 11 by a driver. On the other hand, when the point determined by the absolute value of the detected lateral acceleration G and the absolute value of the lateral jerk dG/dt is in the region C, it is possible to determine that the vehicle is smoothly turned in response to a turning operation of the steering wheel 11 by the driver.

The present invention may be implemented so that it is determined which region in the region determination map shown in FIG. 18 the point determined by the absolute value of the detected steering angle θ detected by the steering operation angle sensor 31 and the absolute value of the yaw rate differentiation value dθ/dt is in, instead of or in addition to determining which region in the region determination map the point determined by the absolute value of the detected yaw rate γ and the absolute value of the yaw rate differentiation value dγ/dt is in.

Also in this case, when the point determined by the absolute value of the detected steering operation angle θ and the absolute value of the steering operation angular velocity dθ/dt is in the region A, it is possible to determine that the vehicle is jerkily turned in response to a turning operation of the steering wheel 11 by a driver. On the other hand, when the point determined by the absolute value of the detected steering operation angle θ and the absolute value of the steering operation angular velocity dθ/dt is in the region C, it is possible to determine that the vehicle is smoothly turned in response to a turning operation of the steering wheel 11 by the driver.

In addition, the present invention may be implemented so that it is determined which region in the region determination map shown in FIG. 18 the point determined by the absolute value of a desired lateral acceleration Gd calculated based on the detected steering operation angle θ and the absolute value of the steering operation angular velocity dθ/dt, or the point determined by the absolute value of a desired yaw rate γd calculated based on the detected steering operation angle θ and the absolute value of the steering operation angular velocity dθ/dt is in, instead of or in addition to determining which region in the region determination map the point determined by the absolute value of the detected yaw rate γ and the absolute value of the yaw rate differentiation value dγ/dt is in.

Also in this case, when the point determined by the absolute value of the steering operation angular velocity dθ/dt, and one of the absolute value of the desired lateral acceleration Gd and the desired yaw rate γd is in the region A, it is possible to determine that the vehicle is jerkily turned in response to a turning operation of the steering wheel 11 by a driver. On the other hand, when the point determined by the absolute value of the steering operation angular velocity dθ/dt, and one of the absolute value of the desired lateral acceleration Gd and the desired yaw rate γd is in the region C, it is possible to determine that the vehicle is smoothly turned in response to a turning operation of the steering wheel 11 by the driver.

It is preferable that the above-described region determination be performed when the steering state of the steering wheel 11 is in a turning operation state. The reason for this is as follows. As described in connection with the first embodiment, in the steering-by-wire steering system, even a driver familiar with the steering characteristics thereof can feel a sense of discomfort with the rapid actual steering action of the right and left front wheels FW1 and FW2 when a returning operation is being performed, and as a result, the turning operation of the steering wheel 11 can become unstable. On the other hand, when a turning operation is being performed, the actual steering amount of the right and left front wheels FW1 and FW2 is relatively gently increased in response to the turning operation of the steering wheel 11, and the driver can therefore stably perform the turning operation of the steering wheel 11. For this reason, the electronic control unit 36 performs the above-described region determination when a turning operation of the steering wheel 11 is being performed.

Modification of Third Embodiment

With regard to the above-described familiarity degree coefficient-determining routine of the third embodiment, the present invention is implemented so that it is determined which of the regions A, B and C in the region determination map the point determined by the absolute value of the detected yaw rate γ and the absolute value of the yaw rate differentiation value dγ/dt obtained by differentiating the detected yaw rate γ with respect to time is in. However, in general, a time delay (phase shift) occurs between the variation with time of the yaw rate γ and the variation with time of the yaw rate differentiation value dγ/dt, as shown by the schematic time series in FIG. 19. For this reason, in this modification of the third embodiment, the electronic control unit 36 executes a familiarity degree coefficient-determining routine capable of more accurately performing the region determination, taking the time delay (phase shift) into consideration. The familiarity degree coefficient-determining routine according to the modification will be described in detail below. However, the same step as that of the familiarity degree coefficient-determining routine of the above third embodiment is designated by the same reference numeral, and detailed description thereof will be omitted.

Figure 20:
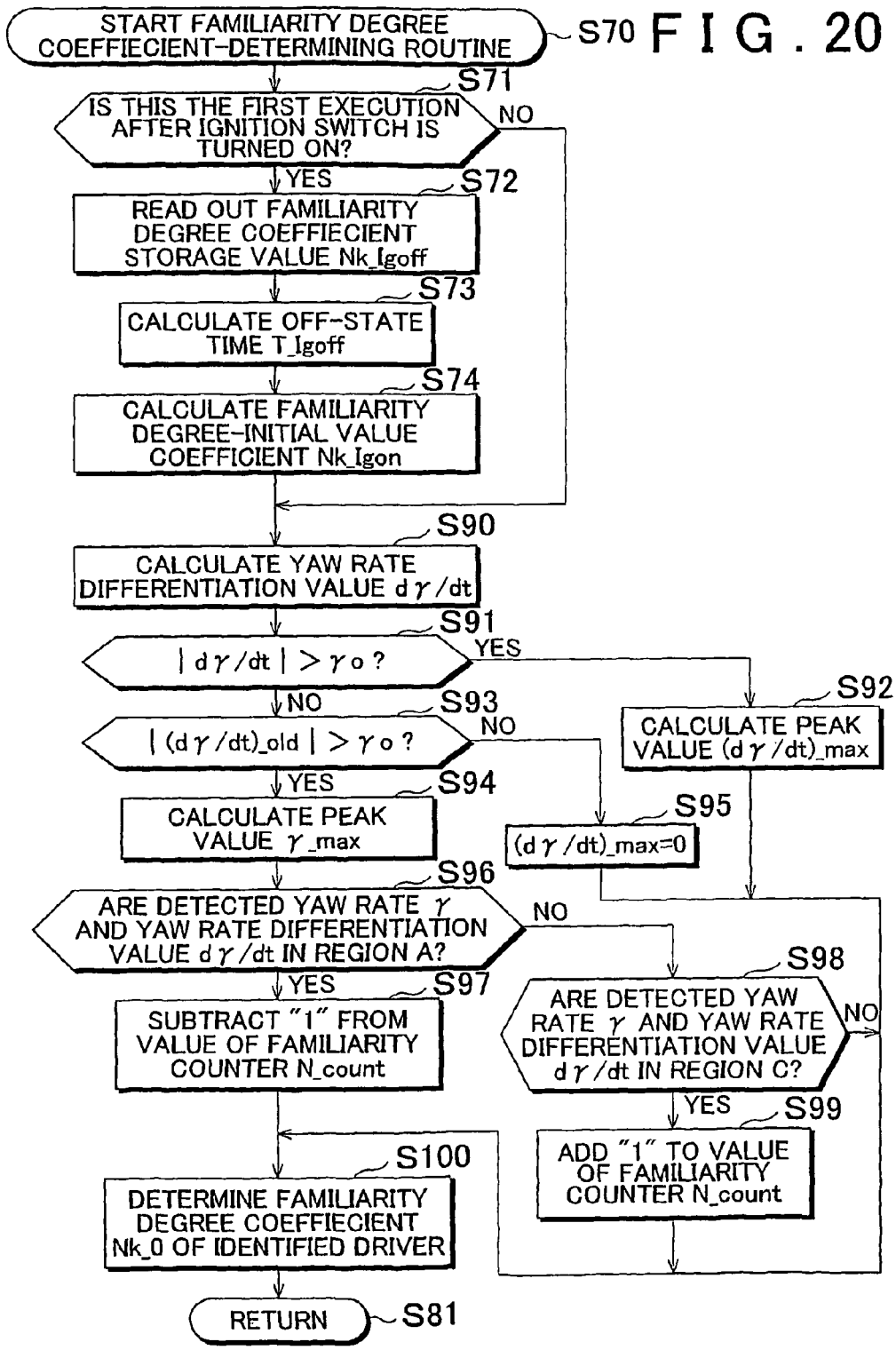
FIG. 20 is a flow chart illustrating a familiarity degree coefficient-determining routine, which is executed by the electronic control unit shown in FIG. 1, according to the modification of the third embodiment of the present invention.

In the familiarity degree coefficient-determining routine according to the modification of the third embodiment, steps S75 to S80 of the familiarity degree coefficient-determining routine according to the above-described third embodiment are changed as shown in FIG. 20. Specifically, the electronic control unit 36 starts to execute the familiarity degree coefficient-determining routine at step S70 as in the case of the familiarity degree coefficient-determining routine of the above third embodiment. In step S71, the electronic control unit 36 determines whether the current execution of the familiarity degree coefficient-determining routine is the first execution after the ignition switch is turned on. When the execution of the familiarity degree coefficient-determining routine is the first execution, the electronic control unit 36 makes an affirmative determination (YES), and performs the processes of steps S72 through S74 as in the case of the familiarity degree coefficient-determining routine of the third embodiment. In this way, the electronic control unit 36 calculates the familiarity degree-initial value coefficient Nk_Igon, and proceeds to step S90. On the other hand, when the current execution of the familiarity degree coefficient-determining routine is the second or later execution, the electronic control unit 36 makes a negative determination (NO), and proceeds to step S90.

In step S90, the electronic control unit 36 calculates the yaw rate differentiation value dγ/dt based on the detected yaw rate γ received from the yaw rate sensor 35 in step S11 of the steering characteristic-changing program. After calculating the yaw rate differentiation value dγ/dt, the electronic control unit 36 proceeds to step S91.

In step S91, the electronic control unit 36 determines whether the absolute value of the yaw rate differentiation value dγ/dt calculated in step S90 is greater than a preset, predetermined reference yaw rate γo. When the absolute value of the yaw rate differentiation value dγ/dt is greater than the reference yaw rate γo, the electronic control unit 36 makes an affirmative determination (Yes), and proceeds to step S92. The reference yaw rate γo is preset based on the value of the actual yaw rate γ detected when the vehicle actually starts to turn.

In step S92, the electronic control unit 36 calculates the peak value (dγ/dt)_max of the yaw rate differentiation value dγ/dt in accordance with the relation shown by the following expression 6.

$$(d\gamma/dt)\_\text{max} = \text{MAX}((d\gamma/dt)\_\text{new}, (d\gamma/dt)\_\text{old}) \quad \text{(Expression 6)}$$

In the expression 6, (dγ/dt)_new represents the yaw rate differentiation value dγ/dt calculated in step S90 during the current execution of the familiarity degree coefficient-determining routine, and (dγ/dt)_old represents the yaw rate differentiation value dγ/dt calculated in step S90 during the preceding execution of the familiarity degree coefficient-determining routine. After calculating the peak value (dγ/dt)_max of the yaw rate differentiation value, the electronic control unit 36 temporarily exits the execution of the familiarity degree coefficient-determining routine.

On the other hand, when the absolute value of the yaw rate differentiation value dγ/dt is equal to or less than the reference yaw rate γo in step S91, the electronic control unit 36 makes a negative determination (No), and proceeds to step S93. In step S93, the electronic control unit 36 determines whether the yaw rate differentiation value dγ/dt is greater than the reference yaw rate γo in step S91 during the preceding execution of the familiarity degree coefficient-determining routine, in other words, whether (dγ/dt)_old is greater than the reference yaw rate γo. This determination will be specifically described below.

Figure 19:
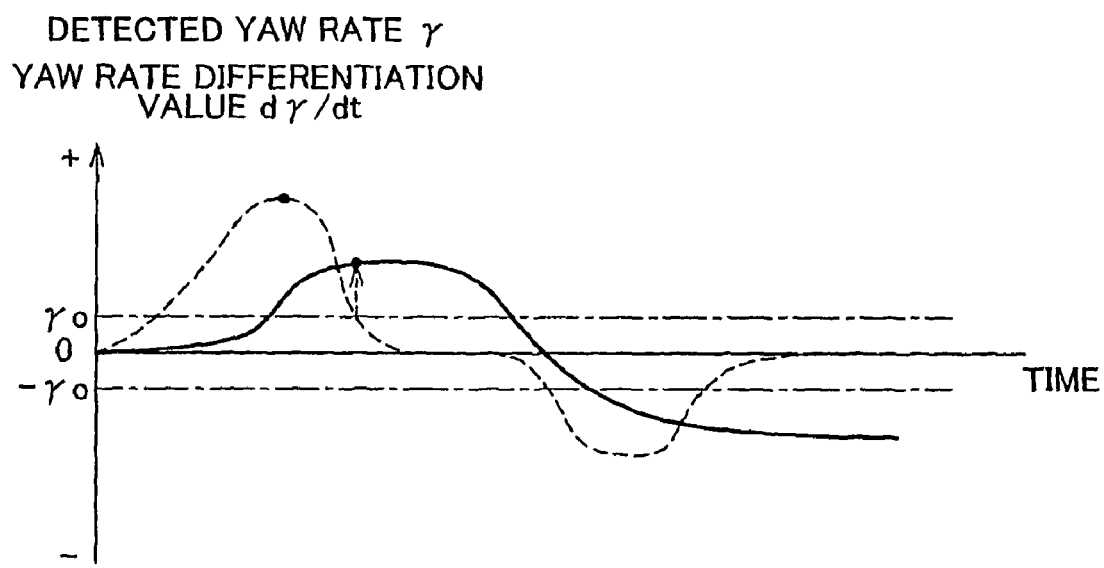
FIG. 19 is a diagram for explaining a delay between a detected yaw rate and a yaw rate differentiation value, related to a modification of the third embodiment of the present invention.

As described above, a time delay (phase shift) occurs between the variation with time of the detected yaw rate γ and the variation with time of the yaw rate differentiation value dγ/dt, more specifically, between the time of occurrence of the peak value γ_max of the detected yaw rate, and the time of occurrence of the peak value (dγ/dt)_max of the yaw rate differentiation value. More specifically, the yaw rate differentiation value dγ/dt that is greater than the reference yaw rate γo reaches a peak value prior to the time of occurrence of the peak value γ_max of the detected yaw rate as shown by the broken line in FIG. 19, and then takes a downward turn to decrease below the reference yaw rate γo. Meanwhile, the detected yaw rate γ reaches the peak value γ_max after the value of the yaw rate differentiation value dγ/dt takes a downward turn as shown by the solid line in FIG. 19. It can be assumed that the peak value γ_max of the detected yaw rate occurs when the yaw rate differentiation value dγ/dt becomes equal to or less than the reference yaw rate γo as shown in FIG. 19.

On the basis of this fact, under conditions where it has been determined that the current yaw rate differentiation value (dγ/dt)_new is equal to or less than the reference yaw rate γo based on the determination in step S91, the electronic control unit 36 determines whether the absolute value of the preceding yaw rate differentiation value (dγ/dt)_old is greater than the reference yaw rate γo in step S93. Specifically, when the absolute value of the yaw rate differentiation value (dγ/dt)_old is greater than the reference yaw rate γo in step S93, it can be assumed that the peak value γ_max of the detected yaw rate has occurred, and the electronic control unit 36 therefore makes an affirmative determination (Yes), and proceeds to step S94.

On the other hand, under conditions where it has been determined that the absolute value of the current yaw rate differentiation value (dγ/dt)_new is equal to or less than the reference yaw rate γo based on the determination in step S91, when the absolute value of the yaw rate differentiation value (dγ/dt)_old is equal to or less than the reference yaw rate γo, the vehicle is not turned to a substantial extent, and the electronic control unit 36 makes a negative determination (No), and proceeds to step S95. In step S95, the peak value (dγ/dt)_max of the yaw rate differentiation value that has been calculated in the calculation process in step S92 of the familiarity degree coefficient-determining routine during or prior to the preceding execution thereof is set to "0" by the electronic control unit 36, and the electronic control unit 36 temporarily exits the execution of the familiarity degree coefficient-determining routine at step S81.

In step S94, based on the determination in step S91, the electronic control unit 36 determines the peak value γ_max of the detected yaw rate at the time point when the current yaw rate differentiation value (dγ/dt)_new becomes equal to or less than the reference yaw rate γo. After determining the peak value γ_max of the detected yaw rate, the electronic control unit 36 proceeds to step S96.

Then, in step S96, the electronic control unit 36 determines whether the point determined by the peak value γ_max (absolute value) of the detected yaw rate and the peak value (dγ/dt)_max (absolute value) of the yaw rate differentiation value calculated in step S92 is in the region A in the region determination map shown in FIG. 18, in other words, whether the vehicle is jerkily turned in response to a turning operation of the steering wheel 11 by the driver. When it is determined using the region determination map shown in FIG. 18 that the point determined by the peak value γ_max (absolute value) of the detected yaw rate and the peak value (dγ/dt)_max (absolute value) of the yaw rate differentiation value is in the region A, the electronic control unit 36 makes an affirmative determination (Yes), and proceeds to step S97.

In step S97, "1" is subtracted from the value of the familiarity counter N_count as in the case of step S77 of the familiarity degree coefficient-determining routine of the above-described third embodiment. After subtracting "1" from the value of the familiarity counter N_count, the electronic control unit 36 proceeds to step S100.

On the other hand, when the point determined by the peak value γ_max (absolute value) of the detected yaw rate and the peak value (dγ/dt)_max (absolute value) of the yaw rate differentiation value is not in the region A in the region determination map, the electronic control unit 36 makes a negative determination (No), and proceeds to step S98. In step S98, the electronic control unit 36 determines whether the point determined by the peak value γ_max (absolute value) of the detected yaw rate and the peak value (dγ/dt)_max (absolute value) of the yaw rate differentiation value is in the region C in the region determination map, in other words, whether a state in which the vehicle is smoothly turned is realized. Specifically, when it is determined using the region determination map shown in FIG. 18 that the point determined by the peak value γ_max (absolute value) of the detected yaw rate and the peak value (dγ/dt)_max (absolute value) of the yaw rate differentiation value is in the region C, the electronic control unit 36 makes an affirmative determination (Yes), and proceeds to step S99.

In step S99, "1" is added to the value of the familiarity counter N_count as in the case of step S79 of the familiarity degree coefficient-determining routine of the above-described third embodiment. After adding "1" to the value of the familiarity counter N_count, the electronic control unit 36 proceeds to step S100.

On the other hand, when the point determined by the peak value γ_max (absolute value) of the detected yaw rate and the peak value (dγ/dt)_max (absolute value) of the yaw rate differentiation value is not in the region C in the region determination map, in other words, when the point determined by the peak value γ_max (absolute value) of the detected yaw rate and the peak value (dγ/dt)_max (absolute value) of the yaw rate differentiation value is in the region B in the region determination map, the electronic control unit 36 makes a negative determination (No), and proceeds to step S100. When the point determined by the peak value γ_max (absolute value) of the detected yaw rate and the peak value (dγ/dt)_max (absolute value) of the yaw rate differentiation value is in the region B in the region determination map, a driver is not unfamiliar with the steering characteristics of the steering-by-wire system, and at the same time, not sufficiently familiar with the steering characteristics. Thus, neither addition to nor subtraction from the value of the familiarity counter N_count is performed by the electronic control unit 36, and the electronic control unit 36 proceeds to step S100.

In step S100, the electronic control unit 36 calculates the familiarity degree coefficient Nk_0 of the identified driver. Specifically, the electronic control unit 36 calculates the familiarity degree coefficient Nk_0 in accordance with the above expression 5 as in the case of the step S80 of the familiarity degree coefficient-determining routine of the above-described third embodiment, using the familiarity degree-initial value coefficient Nk_Igon calculated in step S74, and the value of the familiarity counter N_count that is decremented in step S97 or incremented in step S99.

Thus, also in the case of the modification of the third embodiment, the larger the familiarity degree-initial value coefficient Nk_Igon is, the closer to "1" the result of calculation of the familiarity degree coefficient Nk_0 calculated in accordance with the expression 5 is. Specifically, as shown by the expression 3, the familiarity degree-initial value coefficient Nk_Igon is calculated based on the time coefficient K_time that is set so that the larger the off-state time T_Igoff is, the smaller value the time coefficient K_time has. In other words, the shorter the period between the end of the preceding drive of the vehicle and the start of the current drive of the vehicle is, the larger the result of calculation of the familiarity degree-initial value coefficient Nk_Igon is to some extent; on the other hand, the longer this period is, the smaller the result of calculation of the familiarity degree-initial value coefficient Nk_Igon is. Thus, even in the case of a driver who is familiar with the steering characteristics of the steering-by-wire system owing to the driving experience that has been accumulated until the preceding drive, when the off-state time T_Igoff is long, the familiarity degree coefficient Nk_0 is temporarily made closer to "0", so that it is possible to reduce the chances of feeling a sense of discomfort with the steering characteristics.

The larger the familiarity counter N_count is, the closer to "1" the result of calculation of the familiarity degree coefficient Nk_0 that is calculated in accordance with the above expression 5 is. Specifically, the more smoothly the vehicle is turned in the current drive of the vehicle, the closer to "1" the result of calculation of the familiarity degree coefficient Nk_0 is because the driver is familiar with the steering characteristics of the steering-by-wire system.

Thus, when the familiarity degree-initial value coefficient Nk_Igon is calculated according to the off-state time T_Igoff, and the familiarity degree coefficient Nk_0 is calculated, taking the value of the familiarity counter N_count into consideration, the familiarity degree coefficient Nk_0 is caused to vary, reflecting the manner in which the vehicle is actually turned by the driver. After calculating the familiarity degree coefficient Nk_0, the electronic control unit 36 temporarily exits the execution of the familiarity degree coefficient-determining routine at step S81.

When the electronic control unit 36 temporarily ends the execution of the familiarity degree coefficient-determining routine, the electronic control unit 36 executes the steering characteristic-changing program as in the case of the first to third embodiments. Therefore, description thereof will be omitted.

As will be understood from the above description, according to the modification of the third embodiment, it is possible to determine the familiarity degree coefficient Nk_0 based on the peak value γ_max (absolute value) of the detected yaw rate and the peak value (dγ/dt)_max (absolute value) of the yaw rate differentiation value. Thus, it is possible to more accurately determine the familiarity degree coefficient Nk_0, taking the time delay (phase shift) between the yaw rate γ and the yaw rate differentiation value dγ/dt into consideration. As a result, it is possible to set appropriate steering characteristics for the driver. Accordingly, the driver can more easily drive the vehicle. Other advantageous effects are similar to those of the above first embodiment.

Fourth Embodiment

In the first embodiment, the actual steering characteristic and the reaction force characteristic, that is, the steering characteristics are appropriately changed in accordance with the degree of familiarity of the driver, whereby the present invention is implemented so that a driver can operate the steering-by-wire steering system without feeling a sense of discomfort. However, as described above, the steering-by-wire steering system is configured so that the steering operation input shaft 12 and the actual steering output shaft 22 can rotate relative to each other. Thus, it is possible to quickly steer the right and left front wheels FW1 and FW2 in response to a turning operation of the steering wheel 11 by a driver. The steering characteristics are extremely effective when, for example, a driver performs a turning operation of the steering wheel 11 to avoid collision with an obstacle (hereinafter, this turning operation is referred to as the emergency avoidance operation).

Accordingly, in the fourth embodiment, the present invention is implemented so that, when a driver performs an emergency avoidance operation of the steering wheel 11, the right and left front wheels FW1 and FW2 are steered with a quick response. The fourth embodiment will be described in detail below. The same part as that of the first embodiment is designated by the same reference numeral, and detailed description thereof will be omitted. Needless to say, although the first embodiment is cited in the following description, the fourth embodiment may be implemented in combination with the second embodiment, the third embodiment, of the modification of the third embodiment.

Figure 21:
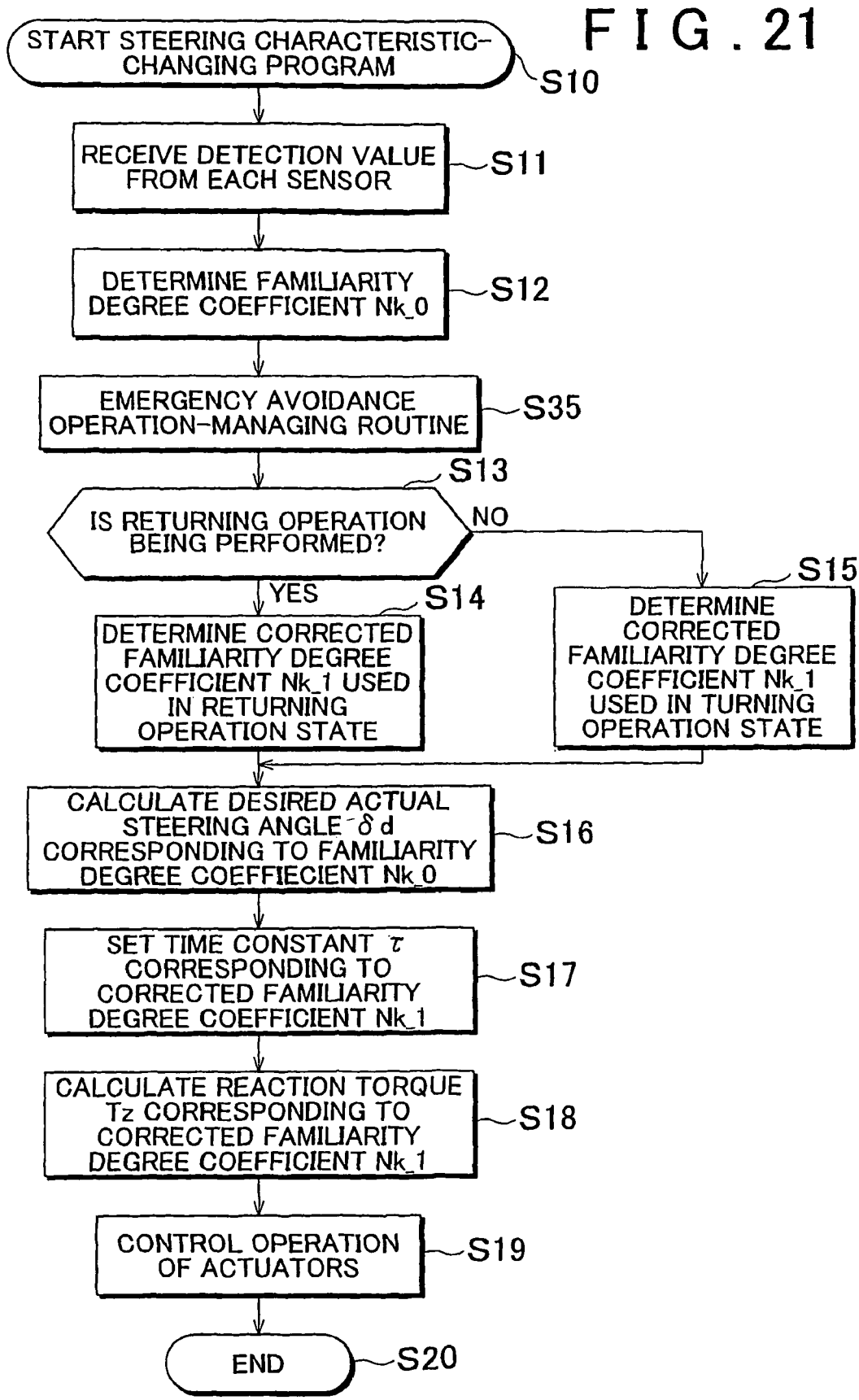
FIG. 21 is a flow chart illustrating the steering characteristic-changing program, which is executed by the electronic control unit shown in FIG. 1, according to the fourth embodiment of the present invention.

In the fourth embodiment, the electronic control unit 36 executes a steering characteristic-changing program shown in FIG. 21. The steering characteristic-changing program of the fourth embodiment is changed from the steering characteristic-changing program described in connection with the first embodiment in that step S35 is added thereto. Specifically, when the ignition switch (not shown) is turned on, the electronic control unit 36 starts to execute the steering characteristic-changing program according to the fourth embodiment from step S10 repeatedly every predetermined short time. Then, the electronic control unit 36 receives a detection value from each sensor in step S11, and estimates and determines the familiarity degree coefficient Nk_0 of a driver in step S12, as in the case of the first embodiment.

The electronic control unit 36 then executes an emergency avoidance operation-managing routine in the subsequent step S35. The emergency avoidance operation-managing routine will be described in detail below.

Figure 22:
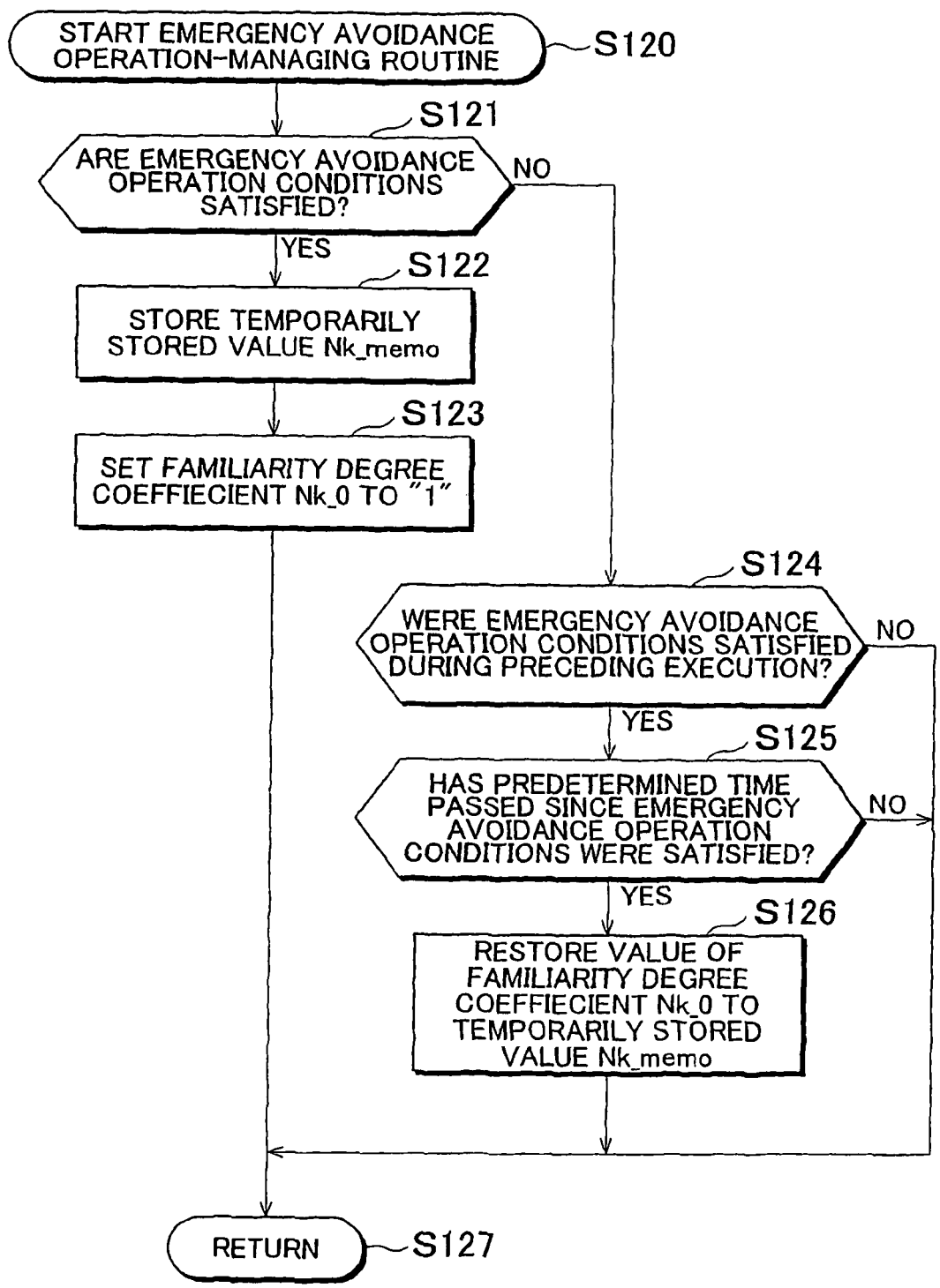
FIG. 22 is a flow chart illustrating an emergency avoidance operation-managing routine of the steering characteristic-changing program shown in FIG. 21.

As shown in FIG. 22, execution of the emergency avoidance operation-managing routine is started at step S120, and, in step 121, the electronic control unit 36 determines whether an emergency avoidance operation of the steering wheel 11 is being performed by a driver. Specifically, the electronic control unit 36 determines whether the following conditions are satisfied: that the absolute value of the detected steering operation angle θ received from the steering operation angle sensor 31 in step S11 of the steering characteristic-changing program is greater than a preset reference steering operation angle θk; that the absolute value of the steering operation angular velocity dθ/dt obtained by differentiating the detected steering operation angle θ with respect to time is greater than a preset reference steering operation angular velocity dθ/dt; and that the detected vehicle speed V received from the vehicle speed sensor 33 is greater than a preset reference vehicle speed Vk (hereinafter, these conditions are collectively referred to as the emergency avoidance operation conditions).

Specifically, when the emergency avoidance operation conditions are satisfied, an emergency avoidance operation of the steering wheel 11 is being performed by a driver, and the electronic control unit 36 therefore makes an affirmative determination (Yes) and proceeds to step S122. In step S122, in order to restore the actual steering characteristic and the reaction force characteristic corresponding to the degree of familiarity of a driver, the familiarity degree coefficient Nk_0 determined in step S12 of the above steering characteristic-changing program is temporarily stored at a predetermined location in the EEPROM by the electronic control unit 36 after the emergency avoidance operation of the steering wheel 11 by the driver is finished. In the following description, the familiarity degree coefficient Nk_0 that is temporarily stored is referred to as the temporarily stored value Nk_memo. After storing the temporarily stored value Nk_memo, the electronic control unit 36 proceeds to step S123.

In step S123, the electronic control unit 36 sets the familiarity degree coefficient Nk_0 of a driver to "1" indicating that the driver has become familiar with the steering characteristics of the steering-by-wire system, and temporarily exits the execution of the emergency avoidance operation-managing routine at step S127. When the processes of step S13 and the following steps of the steering characteristic-changing program are performed as in the case of the first embodiment after the execution of the emergency avoidance operation-managing routine causes the familiarity degree coefficient Nk_0 to be set to "1", the right and left front wheels FW1 and FW2 are steered by a large amount in quick response to a turning operation of the steering wheel 11 by a driver, and a small reaction torque Tz is provided against a turning operation of the steering wheel 11.

Specifically, when the familiarity degree coefficient Nk_0 is set to "1", the corrected familiarity degree coefficient Nk_1 is set to a value closer to "1" (the corrected familiarity degree coefficient Nk_1 is set to "1" when a turning operation is performed). As a result, the result of calculation of the actual steering amount correction coefficient Kg becomes small, and the time constant τ is set to a small value. Thus, the actual steering actuator 21 causes the actual steering output shaft 22 to be rotated relative to the steering operation input shaft 12 by a large amount with a quick response, so that the right and left front wheels FW1 and FW2 are quickly steered. In other words, the vehicle is quickly turned in response to a steering operation of the steering wheel 11 by a driver. Accordingly, it is possible to quickly avoid the collision between the vehicle and the collision obstacle present ahead of the vehicle, for example.

In addition, when the corrected familiarity degree coefficient Nk_1 is set to a value closer to "1" (the corrected familiarity degree coefficient Nk_1 is set to "1" when a turning operation is performed), the correction coefficients Ks, Kf, and Kr for correcting the amount of the spring-term torque Ts, the amount of the friction-term torque Tf, and the amount of the viscosity-term torque Tr, respectively, which constitute the reaction torque Tz are set to small values. Thus, the amount of the reaction torque Tz provided against a turning operation of the steering wheel 11 becomes small, so that a driver can easily turn the steering wheel 11. Accordingly, the driver can perform an emergency avoidance operation of the steering wheel 11 well.

When it is determined in step S121 that the emergency avoidance operation conditions are not satisfied, the electronic control unit 36 makes a negative determination (No), and proceeds to step S124. In step S124, the electronic control unit 36 determines whether it was determined in step S121 during the preceding execution of the emergency avoidance operation-managing routine that the emergency avoidance operation conditions were satisfied. When it was determined during the preceding execution of the emergency avoidance operation-managing routine that the emergency avoidance operation conditions were satisfied, the electronic control unit 36 makes an affirmative determination (Yes), and proceeds to step S125.

In step S125, the electronic control unit 36 determines whether a preset, predetermined time has elapsed since it was determined that the emergency avoidance operation conditions were satisfied. The preset, predetermined time is set based on the time required to avoid a collision with a collision obstacle. When the predetermined time has elapsed since it was determined that the emergency avoidance operation conditions were satisfied, the electronic control unit 36 determines that the collision with the collision obstacle has already been avoided. In this case, the electronic control unit 36 makes an affirmative determination (Yes), and proceeds to step S126.

In step S126, the electronic control unit 36 restores the value of the familiarity degree coefficient Nk_0 that has been set to "1" to the temporarily stored value Nk_memo stored in the EEPROM in step S122, that is, to the value of the familiarity degree coefficient Nk_0 determined in step S12 of the steering characteristic-changing program. The electronic control unit 36 then temporarily exits the execution of the emergency avoidance operation-managing routine at step S127.

When the value of the familiarity degree coefficient Nk_0 is again set to the value of the temporarily stored value Nk_memo after execution of the emergency avoidance operation-managing routine, and thereafter, the processes of step 13 and the following steps of the steering characteristic-changing program are performed as described in the description of the first embodiment, the actual steering characteristic and the reaction force characteristic are appropriately changed according to the degree of driver's familiarity with the steering characteristics of the steering-by-wire steering system. Thus, the right and left front wheels FW1 and FW2 are steered in response to a turning operation of the steering wheel 11 in accordance with the familiarity degree coefficient Nk_0 (corrected familiarity degree coefficient Nk_1), and an appropriate amount of reaction torque Tz is provided against the turning operation, which enables the driver to drive the vehicle without feeling a sense of discomfort when a normal turning operation of the steering wheel 11 is performed by the driver.

When it is determined in step S124 that it was determined during the preceding execution of the routine that the emergency avoidance operation conditions were not satisfied, the electronic control unit 36 makes a negative determination (No), and temporarily exits the execution of the emergency avoidance operation-managing routine in step S127. In this case, the emergency avoidance operation of the steering wheel 11 is not being performed by the driver, and the electronic control unit 36 therefore maintains the value of the familiarity degree coefficient Nk_0 at the value determined in step S12 of the steering characteristic-changing program.

The electronic control unit 36 then performs the processes of step S13 and the following steps of the steering characteristic-changing program as in the case of the first embodiment.

As will be understood from the above description, according to the fourth embodiment, when an emergency avoidance operation of the steering wheel 11 is being performed in order to avoid a collision between the vehicle and the collision obstacle, the familiarity degree coefficient Nk_0 indicating the degree of driver's familiarity with the steering characteristics is temporarily corrected to "1" indicating that the driver is sufficiently familiar with the steering characteristics. Thus, it is possible to enhance the turning performance of a vehicle at the time of an emergency avoidance by making a switch to the reaction force characteristic that makes it possible to turn the steering wheel 11 by a large amount or by making a switch to the actual steering characteristic that the right and left front wheels FW1 and FW2 are quickly turned in response to a turning operation of the steering wheel 11. Accordingly, a driver can very easily drive the vehicle under emergency avoidance conditions.

Other Modifications

The embodiment of the present invention is not limited to the above first to fourth embodiments, and the modifications thereof. Various modifications and alterations can be made without departing from the object of the present invention.

For example, in the first to fourth embodiments, and the modifications thereof, the steering-by-wire steering system is used as the steering system in which the steering operation input shaft 12 and the actual steering output shaft 22 can rotate relative to each other, whereby the present invention is implemented so that the steering characteristics are appropriately changed according to the value of the familiarity degree coefficient Nk_0. However, it is also possible to appropriately change the steering characteristics of, for example, a transmission ratio variable-type steering system according to the familiarity degree coefficient Nk_0.

In this case, it is possible to appropriately change the actual steering characteristic in accordance with the degree of driver's familiarity with the steering system of the variable transmission ratio type by continuously changing the ratio (transmission ratio) of the amount of rotation of the actual steering output shaft to the amount of rotation of the steering operation input shaft by means of a variable transmission mechanism. In addition, it is possible to appropriately change the reaction force characteristic in accordance with the degree of driver's familiarity with the steering system of the variable transmission ratio type by changing the amount of assist provided by an assist mechanism, such as an electric motor or a hydraulic system, for reducing the force required for a driver to turn the steering wheel 11. Thus, a driver can drive a vehicle without feeling a sense of discomfort even in the case of the steering system using a system other than the steering-by-wire system.

The determination of the familiarity degree coefficient Nk_0 in the first to fourth embodiments, and the modifications thereof may be made by appropriately combining the determination methods described in the description of the embodiments and the modifications. Also in this case, the familiarity degree coefficient Nk_0 is suitably determined, and the steering characteristics are optimally changed according to the determined familiarity degree coefficient Nk_0.

In the first to fourth embodiments, and the modifications thereof, the steering wheel 11 that is turned in order to turn a vehicle is used. However, instead of the steering wheel, a joystick-type steering handle that is linearly moved may be used, for example. Any other steering devices can be used as long as it can be operated by a driver, and can be used to provide instructions to steer the vehicle.

In the first to fourth embodiments, and the modifications thereof, the right and left front wheels FW1 and FW2 are steered by rotating the actual steering output shaft 22 by means of the actual steering actuator 21. However, instead of the actual steering output shaft 22, the rack bar 24 may be linearly moved by means of the actual steering actuator 21 to steer the right and left front wheels FW1 and FW2.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the appended claims.

The invention claimed is:

1. A vehicle steering system comprising:
a steering wheel, operated by a driver, for steering a vehicle;
a reaction force actuator for adjusting reaction force provided against an operation of the steering wheel;
an actual steering actuator for steering a steered wheel; and
a controller that adjusts magnitude of the reaction force by driving the reaction force actuator in accordance with an operation of the steering wheel, and that controls steering of the steered wheel by driving the actual steering actuator,
wherein the controller includes:
a familiarity degree-determining section for determining a degree of driver's familiarity with steering characteristics that reflect relations between a certain operation of the steering wheel and both of a reaction force characteristic and an actual steering characteristic of the steered wheel in response to the certain operation of the steering wheel;
a steering characteristic-changing section for changing the steering characteristics in accordance with the determined degree of driver's familiarity; and
an actuator operation-controlling section for controlling operation of the reaction force actuator and the actual steering actuator based on the steering characteristics changed by the steering characteristic-changing section,
wherein the familiarity degree-determining section includes an operation amount-detecting section for detecting an amount of operation of the steering wheel by a driver, and a kinetic state quantity-detecting section for detecting a kinetic state quantity of the vehicle that varies due to an operation of the steering wheel,
wherein the degree of driver's familiarity with the steering characteristics is determined based on at least one of the operation amount detected by the operation amount-detecting section, the kinetic state quantity of the vehicle detected by the kinetic state quantity-detecting section, and a desired kinetic state quantity of the vehicle that is calculated based on the detected operation amount, and
wherein the familiarity degree-determining section determines the degree of driver's familiarity based on the steering wheel operation amount detected by the operation amount-detecting section, and a value of a time derivative of the detected operation amount.

2. The vehicle steering system according to claim 1, wherein the familiarity degree-determining section determines the degree of driver's familiarity based on a peak value, in terms of variation with time, of the steering wheel operation amount detected by the operation amount-detecting section, and a peak value, in terms of variation with time, of the time derivative of the operation amount.

3. The vehicle steering system according to claim 1, wherein
the familiarity degree-determining section determines the degree of driver's familiarity based on the kinetic state quantity of the vehicle detected by the kinetic state quantity-detecting section, and a value of a time derivative of the detected kinetic state quantity of the vehicle.

4. The vehicle steering system according to claim 3, wherein
the familiarity degree-determining section determines the degree of driver's familiarity based on a peak value, in terms of variation with time, of the kinetic state quantity of the vehicle detected by the kinetic state quantity-detecting section, and a peak value, in terms of variation with time, of the time derivative of the kinetic state quantity of the vehicle.

5. The vehicle steering system according to claim 1, wherein
the familiarity degree-determining section determines the degree of driver's familiarity based on a value of a time derivative of the steering wheel operation amount detected by the operation amount-detecting section, and a value of a desired lateral acceleration of the vehicle or a value of a desired yaw rate of the vehicle, the latter two values being calculated based on the detected steering wheel operation amount.

6. The vehicle steering system according to claim 5, wherein
the familiarity degree-determining section determines the degree of driver's familiarity based on a peak value, in terms of variation with time, of the time derivative of the steering wheel operation amount detected by the operation amount-detecting section, and a peak value, in terms of variation with time, of the calculated, desired lateral acceleration or desired yaw rate of the vehicle.

7. The vehicle steering system according to claim 1, wherein
the kinetic state quantity-detecting section detects at least one of lateral acceleration and yaw rate of the vehicle caused due to an operation of the steering wheel.

8. The vehicle steering system according to claim 1, wherein
the familiarity degree-determining section determines the degree of driver's familiarity when a turning operation of the steering wheel that causes an absolute value of the operation amount detected by the operation amount-detecting section to increase is being performed.

9. The vehicle steering system according to claim 1, wherein the familiarity degree-determining section includes:
an operation amount-detecting section for detecting an amount of operation of the steering wheel by a driver;
a kinetic state quantity-detecting section for detecting a kinetic state quantity of the vehicle that varies due to an operation of the steering wheel;
an ignition switch operation state-detecting section for detecting an operational state of an ignition switch provided in the vehicle;
a familiarity degree coefficient-determining section for determining a familiarity degree coefficient that indicates the degree of driver's familiarity, based on at least one of the operation amount detected by the operation amount-detecting section, the kinetic state quantity of the vehicle detected by the kinetic state quantity-detecting section, and a desired kinetic state quantity of the vehicle that is calculated based on the detected operation amount;
a familiarity degree coefficient-storing section for storing the familiarity degree coefficient that is determined by the familiarity degree coefficient-determining section immediately before a shift to an off state of the ignition switch is detected by the ignition switch operation state-detecting section;
an off-state time-determining section for, when a shift from an off state to an on state of the ignition switch is detected by the ignition switch operation state-detecting section, determining off-state time during which the ignition switch is maintained in the off state; and
a familiarity degree coefficient-correcting section for correcting the familiarity degree coefficient stored in the familiarity degree coefficient-storing section, based on the off-state time determined by the off-state time-determining section,
wherein the steering characteristic-changing section changes the steering characteristics based on the degree of familiarity indicated by the familiarity degree coefficient corrected by the familiarity degree coefficient-correcting section.

10. The vehicle steering system according to claim 9, wherein
the familiarity degree coefficient-correcting section corrects the familiarity degree coefficient stored in the familiarity degree coefficient-storing section so that the longer the off-state time determined by the off-state time-determining section is, the less familiarity of a driver with the steering characteristics that reflect relations between a certain operation of the steering wheel and both of a reaction force characteristic and an actual steering characteristic of the steered wheel in response to the certain operation of the steering wheel the familiarity degree coefficient indicates.

11. The vehicle steering system according to claim 1, wherein
the controller further includes: a driver-identifying section for identifying a driver who drives the vehicle; a driver-dependent familiarity degree coefficient-storing section for storing the degree of familiarity determined by the familiarity degree-determining section for each driver who is identified by the driver-identifying section; and a familiarity degree-setting section for performing initial setting of the degree of familiarity of each driver identified by the driver-identifying section, using the degree of familiarity stored in the driver-dependent familiarity degree coefficient-storing section.

12. The vehicle steering system according to claim 11, wherein
the controller further includes: an ignition switch operation state-detecting section for detecting an operational state of an ignition switch provided in the vehicle; an off-state time-determining section for, when a shift from an off state to an on state of the ignition switch is detected by the ignition switch operation state-detecting section in response to an operation by a driver identified by the driver-identifying section, determining off-state time during which the ignition switch is maintained in the off state; and a driver-dependent familiarity degree correction section for correcting the familiarity degree, of which initial setting has been performed by the familiarity degree-setting section, so that the longer the off-state time determined by the off-state time-determining section is, the less familiarity of a driver with the steering characteristics that reflect relations between a certain operation of the steering wheel and both of a reaction force characteristic and an actual steering characteristic of the steered wheel in response to the certain operation of the steering wheel the familiarity degree indicates.

13. The vehicle steering system according to claim 1, wherein
the steering characteristic-changing section includes at least one of a reaction force characteristic changing section for making a switch to a reaction force characteristic that the less familiar with the steering characteristics a driver is, the stronger the reaction force provided against an operation of the steering wheel is, based on the familiarity degree determined by the familiarity degree-determining section, and an actual steering characteristic-changing section for making a switch to an actual steering characteristic that the less familiar with the steering characteristics a driver is, the gentler the actual steering action of the steered wheel is in response to an operation of the steering wheel, based on the familiarity degree determined by the familiarity degree-determining section.

14. The vehicle steering system according to claim 13, wherein
the actual steering characteristic-changing section makes a switch to an actual steering characteristic that the less familiar with the steering characteristics a driver is, the smaller a ratio of an amount of actual steering of the steered wheel to an amount of operation of the steering wheel becomes, and the larger a time constant of the actual steering actuator driven in response to an operation of the steering wheel becomes.

15. The vehicle steering system according to claim 1, wherein
the controller further includes: an emergency avoidance operation state-determining section for determining whether an emergency avoidance operation of the steering wheel is being performed by a driver; and an emergency avoidance operation-time familiarity degree-correcting section for, when it is determined by the emergency avoidance operation state-determining section that the emergency avoidance operation of the steering wheel is being performed by a driver, correcting the familiarity degree determined by the familiarity degree-determining section so that the familiarity degree indicates that a driver is sufficiently familiar with the steering characteristics.

16. The vehicle steering system according to claim 15, wherein
the emergency avoidance operation state-determining section determines whether an emergency avoidance operation is being performed, based on an amount of operation of the steering wheel, a value of a time derivative of the operation amount, and a speed of the vehicle.

17. A method of controlling a vehicle steering system that includes: a steering wheel, operated by a driver, for steering a vehicle; a reaction force actuator for adjusting reaction force provided against an operation of the steering wheel; an actual steering actuator for steering a steered wheel; and a controller that adjusts magnitude of the reaction force by driving the reaction force actuator in accordance with an operation of the steering wheel, and that controls steering of the steered wheel by driving the actual steering actuator, the method comprising:
determining a degree of driver's familiarity with steering characteristics that reflect relations between a certain operation of the steering wheel and both of a reaction force characteristic and an actual steering characteristic of the steered wheel in response to the certain operation of the steering wheel;
changing the steering characteristics in accordance with the determined degree of driver's familiarity; and
controlling operation of the reaction force actuator and the actual steering actuator based on the changed steering characteristics,
wherein the determining the degree of driver's familiarity includes detecting an amount of operation of the steering wheel by a driver, and detecting a kinetic state quantity of the vehicle that varies due to an operation of the steering wheel,
wherein the degree of driver's familiarity with the steering characteristics is determined based on at least one of the detected operation amount, the detected kinetic state quantity of the vehicle, and a desired kinetic state quantity of the vehicle that is calculated based on the detected operation amount, and
wherein the degree of driver's familiarity is determined based on the detected steering wheel operation amount, and a value of a time derivative of the detected operation amount.

* * * * *